(12) United States Patent
Hering et al.

(10) Patent No.: US 12,105,002 B2
(45) Date of Patent: *Oct. 1, 2024

(54) PULSED CONDENSATION PARTICLE COUNTER

(71) Applicant: Aerosol Dynamics Inc., Berkeley, CA (US)

(72) Inventors: Susanne Vera Hering, Berkeley, CA (US); Gregory Stephen Lewis, Berkeley, CA (US); Steven Russel Spielman, Oakland, CA (US)

(73) Assignee: Aerosol Dynamics Inc., Berkeley, CA (US)

( * ) Notice: Subject to any disclaimer, the term of this patent is extended or adjusted under 35 U.S.C. 154(b) by 304 days.

This patent is subject to a terminal disclaimer.

(21) Appl. No.: 17/492,955

(22) Filed: Oct. 4, 2021

(65) Prior Publication Data

US 2022/0026332 A1    Jan. 27, 2022

Related U.S. Application Data

(63) Continuation-in-part of application No. PCT/US2020/026641, filed on Apr. 3, 2020.
(Continued)

(51) Int. Cl.
*G01N 15/06* (2024.01)
*G01N 15/075* (2024.01)

(52) U.S. Cl.
CPC ........... *G01N 15/065* (2013.01); *G01N 15/06* (2013.01); *G01N 15/075* (2024.01)

(58) Field of Classification Search
CPC ................ G01N 15/065; G01N 15/06; G01N 2015/0693
See application file for complete search history.

(56) References Cited

U.S. PATENT DOCUMENTS

| 2,684,008 | A | 7/1954 | Vonnegut | |
| 2006/0126056 | A1* | 6/2006 | Roberts | G01N 15/0205 356/37 |
| 2011/0001963 | A1* | 1/2011 | Durack | G01N 15/1434 356/338 |

FOREIGN PATENT DOCUMENTS

| CA | 674040 | 11/1963 |
| DE | 1448148 A1 * | 10/1968 |

(Continued)

OTHER PUBLICATIONS

Iida, Kenjiro, et al. "An ultrafine, water-based condensation particle counter and its evaluation under field conditions." Aerosol Science and Technology 42.10 (2008): 862-871. (Year: 2008).*

(Continued)

*Primary Examiner* — Dominic J Bologna
(74) *Attorney, Agent, or Firm* — Vierra Magen Marcus LLP

(57) ABSTRACT

A method and apparatus to create water vapor supersaturation and particulate counts from an air sample. The method and apparatus include introducing an air sample into a chamber by passing a flow into the chamber through the inlet by pumping at the outlet. The method further includes closing the inlet while continuing the pumping to exhaust the air sample from the chamber through the outlet. The pumping is performed at a rate operable to reduce pressure inside the chamber such that the air sample in the central portion of the chamber cools, and water vapor from walls of the chamber has time to diffuse into the air sample in the chamber from the walls. The cycles are repeated by continuously repeating the introducing and closing. The walls of the chamber may be wet or dry.

21 Claims, 24 Drawing Sheets

Related U.S. Application Data

(60) Provisional application No. 62/830,346, filed on Apr. 5, 2019.

(56) References Cited

FOREIGN PATENT DOCUMENTS

| | | | |
|---|---|---|---|
| EP | 2194370 | 6/2010 | |
| EP | 2194370 A1 * | 6/2010 | ........... G01N 15/065 |
| NL | 265069 | 6/1964 | |

OTHER PUBLICATIONS

Hering, Susanne V., et al. "A laminar-flow, water-based condensation particle counter (WCPC)." Aerosol Science and Technology 39.7 (2005): 659-672. (Year: 2005).*

English machine translation of EP-2194370-A1 (Year: 2010).*

English machine translation of DE1448148A1 (Year: 1968).*

Hering et al., "Pulsed Diffusion Condensation Particle Counter", U.S. Appl. No. 17/568,940, filed Jan. 5, 2022.

McMurry, Peter H. "The History of Condensation Nucleus Counters", Aerosol Science & Technology, vol. 33, No. 4 (2000), pp. 297-322.

Stolzenburg, Mark R., et al. "An Ultrafine Aerosol Condensation Nucleus Counter", Aerosol Science and Technology, vol. 14, No. 1 (1991), pp. 48-65.

Iida, Kenjiro et al. "Effect of Working Fluid on Sub-2 nm Particle Detection with a Laminar Flow Ultrafine Condensation Particle Counter", Aerosol Science and Technology, vol. 43, No. 1 (2009), pp. 81-96.

Hering, Susanne V., et al. "Detection Near 1-nm with a Laminar-Flow, Water-Based Condensation Particle Counter", Aerosol Science and Technology, vol. 51, No. 3 (2017), pp. 354-362.

Vanhanen, J., et al. "Particle Size Magnifier for Nano-CN Detection", Aerosol Science and Technology, vol. 45, No. 4 (2011), pp. 533-542.

Aitken, John "On the Number of Dust Particles in the Atmosphere", Transactions of the Royal Society of Edinburgh, vol. XXXV, (1888), pp. 1-20.

Rich, T.A. "A Continuous Recorder for Condensation Nuclei", Geofisica pura e applicata, vol. 50, No. 1 (1961), pp. 46-52.

Skala, G.F. "A New Instrument for the Continuous Measurement of Condensation Nuclei", Analytical Chemistry, vol. 35, No. 6 (1963), pp. 702-706.

Pinterich, T., et al. "The Versatile Size Analyzing Nuclei Counter (vSANC)", Aerosol Science and Technology, vol. 50, No. 9 (2016), pp. 947-958.

Saghafifar, Hossein et al. "Characterization of a Modified Expansion Condensation Particle Counter for Detection of Nanometer-Sized Particles", Aerosol Science and Technology, vol. 43, No. 8 (2009), pp. 767-780.

International Search Report and Written Opinion dated Feb. 11, 2021, International Application No. PCT/US2020/026641.

Kenjiro, Iida et al., "An Ultrafine Water-Based Condensation Particle Counter and its Evaluation under Field Conditions", Aerosol Science and Technology, vol. 42, No. 10, Sep. 16, 2008, pp. 862-871.

Hering, Susanne V. et al., "A Laminar-Flow, Water-Based Condensation Particle Counter (WCPC)", Aerosol Science and Technology, vol. 39, No. 7, Jul. 1, 2005, pp. 659-672.

Preliminary Amendment dated Aug. 23, 2022, U.S. Appl. No. 17/568,940.

International Preliminary Report on Patentability dated Oct. 14, 2021, International Application No. PCT/US2020/026641.

Non-Final Office Action dated Oct. 19, 2023, U.S. Appl. No. 17/494,449, 12 pages.

Saghafifar, Hossein et al., Characterization of a Modified Expansion Condensation Particle Counter for Detection of Nanometer-Sized Particles, May 2009, pp. 767-780.

First Office Action dated Dec. 28, 2023, Chinese Patent Application No. 202080027396.2, 21 pages.

Response to Office Action dated Jul. 4, 2024, Chinese Patent Application No. 202080027396.2, 19 pages.

Notice of Allowance dated May 30, 2024, U.S. Appl. No. 17/568,940, 43 pages.

* cited by examiner

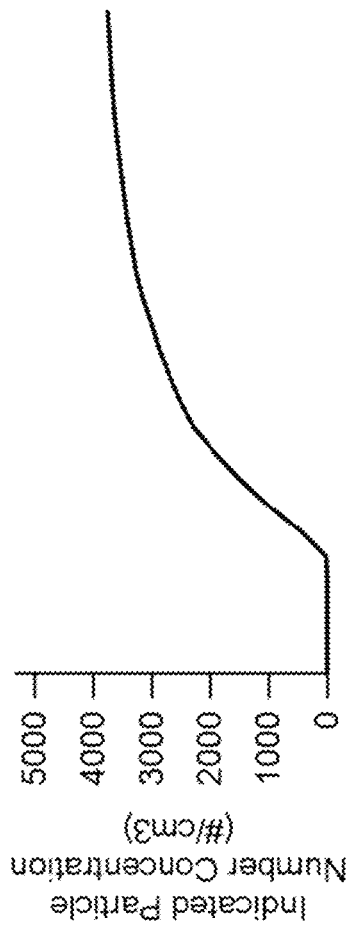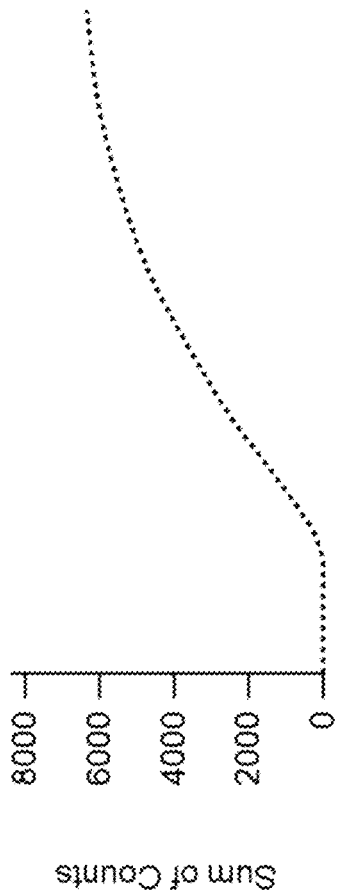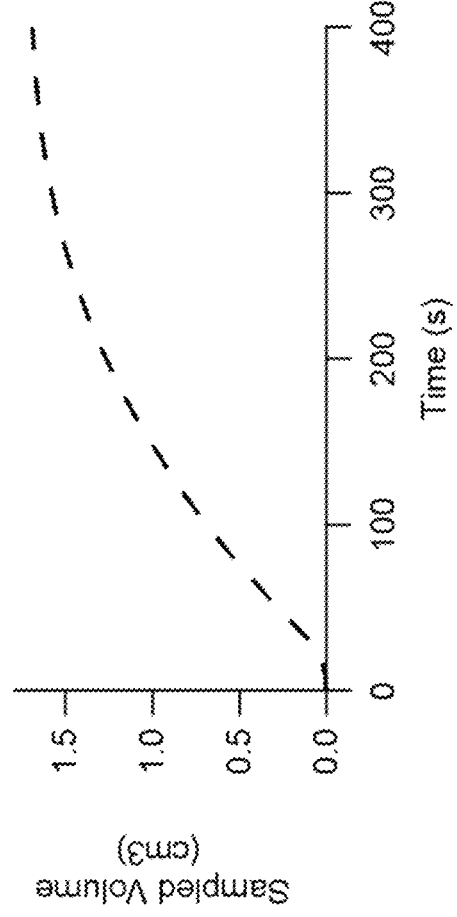
Figure 8C
Figure 8B
Figure 8A

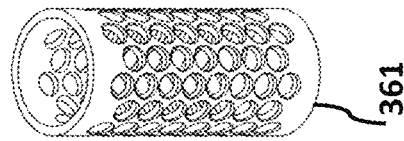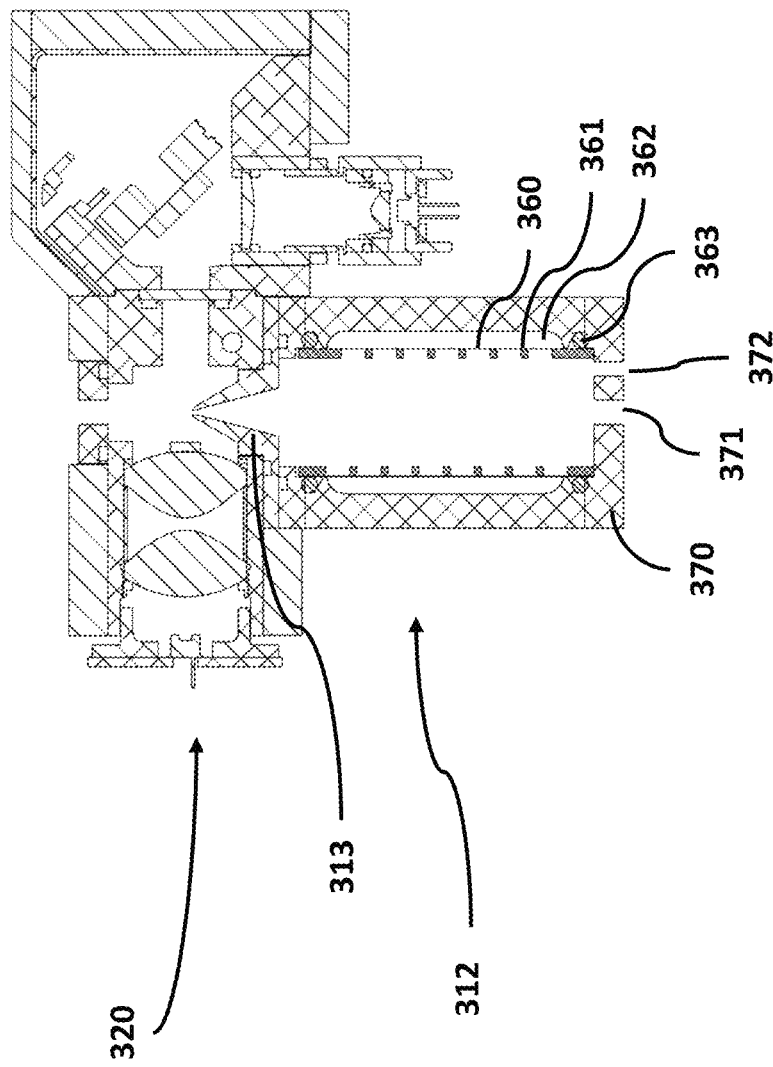

PULSED CONDENSATION PARTICLE COUNTER

CROSS REFERENCE TO RELATED APPLICATION

This application is a Continuation In Part of and claims the benefit of priority to International Application Serial Number PCT/US2020/026641 (published as WO 2021/002908), filed Apr. 3, 2020, which claims the benefit of priority to U.S. Provisional Patent Application No. 62/830,346 filed on Apr. 5, 2019, the contents of both of which are hereby fully incorporated by reference herein.

GOVERNMENT RIGHTS

This technology was made with support from the US Department of Energy, under grant number DE-S00020496 and the National Institutes of Health grants OH10515 and ES031458. The government has certain rights in this technology.

FIELD

The technology pertains to the measurement of particles suspended in air or other gas.

BACKGROUND

Airborne particles in the ultrafine size range, loosely defined as those with diameters from 5 nm to 100 nm, are ubiquitous in urban air. Inhalation of these particles is considered a health risk and is implicated in shortening human lifetimes. Additionally, ultrafine particles are the dominant contributor to the total number of particles found in the atmosphere. Some ultrafine particles grow very rapidly, and can act as seeds for cloud formation, and thus play a role in global climate.

Typically, the number concentration of airborne particle number concentration measurements that encompass the ultrafine size range are done by condensation particle counting, wherein individual particles are enlarged to optically detectable sizes through vapor condensation. This approach enables the detection of particles as small as a few nanometers in diameter, which otherwise are too small to be seen by optical scattering.

Over the decades many types of condensation particle counters have been developed. Some detect particles as small 2 to 3 nm. Others are compact, but have a limited period of operation, 4-8 hours, as a result of the depletion of the condensing fluid.

SUMMARY

Technology for aerosol analysis is provided. One general aspect includes a method for measuring a concentration of particles in air. The method includes introducing an air sample into a particle chamber through an inlet and closing the inlet to isolate the particle chamber. The method also includes exhausting the air sample in the isolated particle chamber through a nozzle connected to an optical detector, said exhausting of the flow performed at a flow rate chosen to cause an expansion of the air sample inside the particle chamber, said expansion causing a reduction in a temperature of the any of the air sample inside the particle chamber, an increase in a relative humidity of any of the air sample inside the particle chamber, and cause water vapor to condense on particles suspended in the any of the air sample inside the particle chamber, thereby forming droplets. The method also includes counting the individual droplets in the air sample as it is exhausted through an optical detector and measuring a pressure from which an amount of air exiting the chamber can be assessed. The method also includes determining a particle concentration as a ratio of a number of droplets detected to the amount of air that has exited the chamber based on the counting and the measuring. In a further aspect, the method may include performing the counting and measuring steps simultaneously. Other embodiments of this aspect include corresponding computer systems, apparatus, and computer programs recorded on one or more computer storage devices, each configured to perform the actions of the method.

The method may further include performing the method where walls of the particle chamber are wet, or performing the method when the walls of the particle chamber are dry and the air sample is humid. The method may further include humidifying the air sample prior to introducing the air sample into the particle chamber. The method may further include a method in which walls of the particle chamber are formed from a membrane including sulfonated tetrafluoroethylene based fluoropolymer-copolymer on a first side, and having a second side in contact with water or high humidity air, and where the method further includes pausing between isolating of the particle chamber and the exhausting of the flow, such that the air within the particle chamber becomes humidified prior to expansion. The method may further include the counting, measuring, and determining performed during the exhausting. The method may further include continuously repeating the introducing and exhausting.

Another general aspect includes a method to create water vapor supersaturation within a wet-walled chamber having an inlet and an outlet; including: introducing an air sample into the chamber by passing a flow into the wet walled chamber through the inlet by pumping at the outlet; and closing the inlet while continuing the pumping to exhaust the air sample from the chamber through the outlet, the pumping performed at a rate operable to reduce pressure inside the chamber such that the air sample in a central portion of the chamber cools, and water vapor from walls of the chamber has time to diffuse into the air sample in the chamber from the walls. Other embodiments of this aspect include corresponding computer systems, apparatus, and computer programs recorded on one or more computer storage devices, each configured to perform the actions of the methods.

Implementations of this aspect may include one or more of: the method including continuously repeating the introducing and closing; and the method further including pausing between introducing and the closing, such that the air sample within the wet-walled chamber becomes humidified prior to expansion. The method may further include: counting droplets in the air sample as it is exhausted through an optical detector, measuring a pressure from which an amount of air exiting the chamber can be assessed, and determining a particle concentration as a ratio of a number of droplets detected to the amount of air that has exited the chamber based on the counting and the measuring.

Another general aspect includes a particle counting apparatus, including: an inlet; a first valve coupled to the inlet; a particle chamber coupled to the first valve and having an output; an optical detector at the output of the particle chamber and having a detector outlet; a pump coupled the detector output and having a pump outlet; a second valve coupled between the detector output and the pump; and a controller executing code instructing the controller to: open the first and second valves, and cause the pump to introduce air into the particle chamber and pump a flow of air through the chamber from the inlet, through to the detector outlet; and close the first valve and cause the pump at the outlet to pull air out of the chamber thereby reducing pressure inside the chamber at a flow rate selected to cause the air in a central portion of the chamber to cool and allow water vapor from walls of the chamber to diffuses into the air in the chamber from wet walls.

Implementations may include the apparatus where the controller executes code instructing the controller to close the second valve for less than two seconds while the first valve is closed and prior to causing the pump to reduce pressure inside the chamber. Implementations may include the apparatus where the pump is coupled to the detector output by two flow paths between the detector output, one flow path including the second valve and another flow path including a third valve, such that a flow rate at which air is introduced into the particle chamber, and a rate at which air is exhausted from the chamber once the first valve is closed, may be independently controlled. Implementations may include the apparatus where the optical detector is configured to count particles larger than about 400 nm when the first and second valves are open and the flow is drawn through the particle chamber. Implementations may include the apparatus where the controller executes code instructing the controller to count droplets in the air sample as it is exhausted through an optical detector, measure a pressure from which an amount of air exiting the chamber can be assessed, and determine a particle concentration as a ratio of a number of droplets detected to the amount of air that has exited the chamber based on the counting and the measuring. Implementations may include the apparatus where the controller executes code instructing the controller to repeatedly: open the first and second valves and cause the pump to introduce air into the particle chamber; and close the first valve and cause the pump at the outlet to pull air out of the chamber. Implementations may also include the apparatus where the controller executes code instructing the controller to repeatedly: open the first and second valves, and cause the pump to introduce air into the particle chamber; close the second valve and then close the first valve to cause the air in the particle chamber to humidify; to open the second valve while the first valve remains closed and cause the pump at the outlet to pull air out of the chamber.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 8A is a graph of the cumulative air volume passing exiting the particle chamber, vs. time, calculated from the pressure data from the first pulse of FIG. 7.

FIG. 8B is the sum of detected particles exiting the particle chamber into the optical detector for the first pulse of FIG. 7.

FIG. 8C is the indicated particle number concentration at each that point in the expansion state derived from the total number of droplets detected, divided by the volume sampled.

FIG. 16A is a side, cut-away view of a particle chamber and optical detector of a Pulsed CPC configured with sulfonated tetrafluoroethylene-based fluoropolymer-copolymer surrounded by a water jacket.

FIG. 16B is a perspective view of a rigid cage used to support a Nafion membrane in the embodiment of FIG. 16A.

DETAILED DESCRIPTION

Figure 1A:
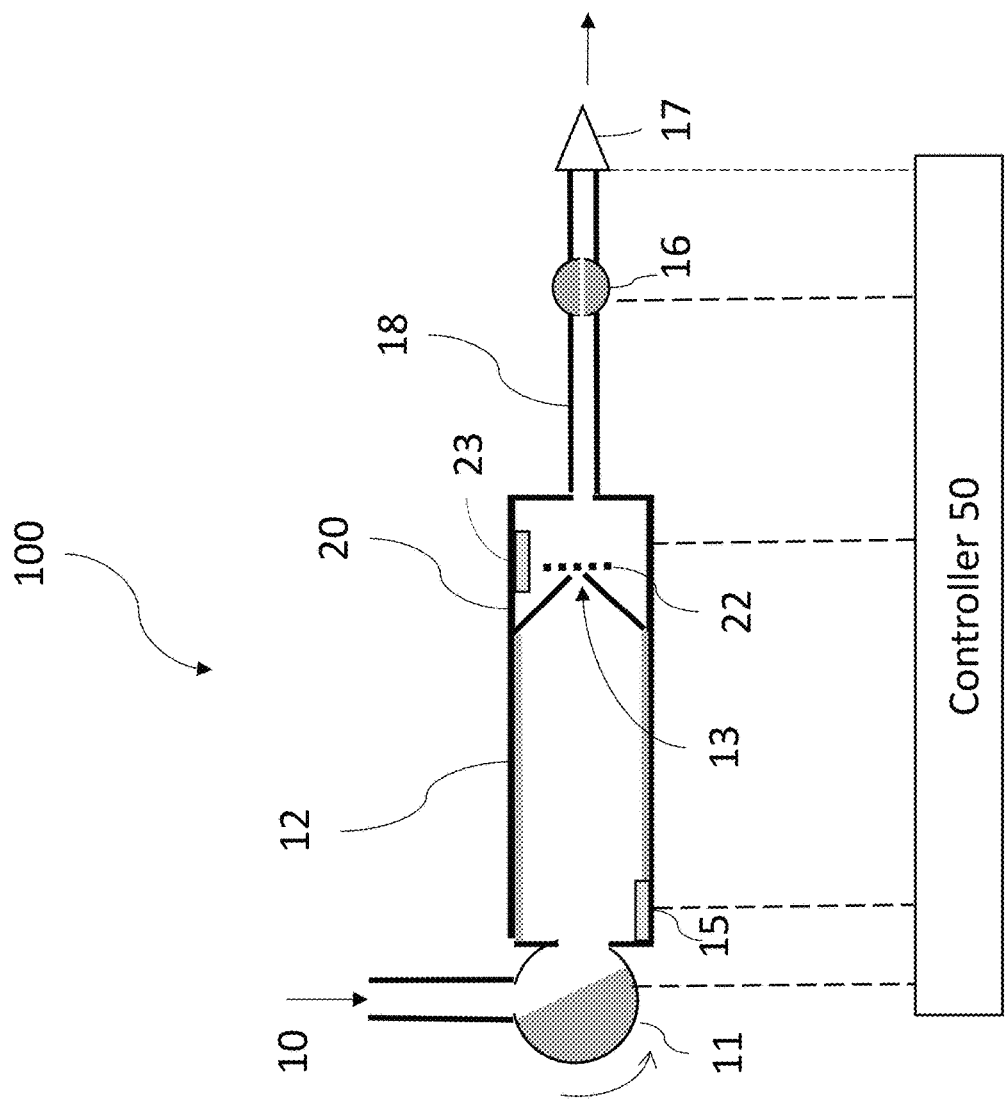
FIG. 1A is a first embodiment of a Pulsed Condensation Particle Counter (Pulsed CPC).

The technology pertains to the measurement of particles suspended in air or other gas. More specifically, the technology pertains to devices and methods in which the size of particles is enlarged through condensation of water vapor onto the particle. These particle condensation techniques are most commonly applied to the detection, collection or inertial manipulation of airborne particles that are smaller than a few micrometers, or a few hundred nanometers in diameter. The Pulsed Condensation Particle Counter (Pulsed CPC) of this technology is a new approach for enlarging and detecting ultrafine particles through water vapor condensation. The Pulsed CPC utilizes the cooling created by adiabatic expansion, optionally in combination with the diffusive transport of water vapor from wet walls, to create the supersaturation for particle growth. The resulting condensationally enlarged particles are individually counted as the flow exits through an optical chamber. The single particle counting of this technology removes uncertainty associated with the ensemble scattering approach of prior adiabatic expansion instruments.

Generally, condensation particle counters work by condensing a material, such as water or alcohol, onto particles that are suspended in the air, and subsequently detecting the droplets formed by optical means. This technology uses this same basic principle of condensational enlargement and optical detection.

For small particles, the underlying physics of condensational growth requires supersaturation, defined as a region in which the vapor pressure of the condensing vapor is higher than its saturation value. Simple saturation is not sufficient to initiate condensational growth because the equilibrium vapor pressure above the curved surface is higher than over a flat surface of the same chemical composition. This is due to the surface energy, a phenomenon described by the Kelvin relation. The level of required supersaturation increases as the inverse of the particle diameter, so that higher supersaturation values are required for smaller particles. The relative humidity needed to activate the condensational growth of a 6 nm particle is in the range of 140%, depending on particle chemical composition.

Super-saturated conditions are inherently a non-equilibrium state. The flow at walls of the bounding container cannot be supersaturated as any excess water vapor will simply deposit. However, it is possible to create supersaturated conditions within the core of the flow, or in the core of a confined volume. Methods of achieving this include: (1) the rapid (generally turbulent) mixing of saturated flows of differing temperatures; (2) laminar-flow diffusion; and (3) adiabatic expansion of a nearly saturated flow.

Most condensation particle counters in use today employ either of the first two of these methods, namely turbulent mixing or laminar flow diffusion. These are continuous flow devices and offer the advantage of 'single particle counting', wherein the droplets formed from condensational growth are passed through a light source and detected and counted individually. These approaches offer high sensitivity and precision. Some devices are capable of detection of particles as small as 2 nm to 3 nm. Yet they also require maintaining regions of the system at either high, or low temperatures, which consumes energy. Generally, they also require liquid reservoirs, which makes them intolerant to motion and tipping.

Adiabatic expansion, the third of these methods, is the oldest, dating from the nineteenth century. None of the previous or existing adiabatic expansion instruments are continuous flow devices, and none are capable of automated single particle counting; that is, none directly detect and enumerate the individual droplets formed. Indeed, they are inherently non-steady flow instruments, requiring introduction of a sample into a volume that is subsequently sealed and expanded. The measured quantity is the light scattered from the ensemble, or cloud, of droplets formed inside the expansion chamber, from which particle number concentration is inferred. Such devices do not count individual droplets passing through a light beam, as in the continuous flow instruments described above. As such, they are sensitive to the extent of droplet growth, as well as the particle number concentration and therefore lack the precision of the single particle counting instruments.

The present technology comprises a pulsed condensation particle counter 100 (Pulsed CPC) which uses adiabatic expansion to create cooling, and yet is configured to individually count the condensationally enlarged particles. It can be operated either with dry walls, or with wet walls. The latter enhances the super-saturation through the combined effect of cooling from adiabatic expansion and diffusive transport of water vapor from wetted walls. In either configuration the Pulsed CPC approach provides the single-particle counting advantages of the continuous flow instruments, while maintaining the lower energy requirements of the adiabatic approach.

A first embodiment of a Pulsed CPC 100 is illustrated in FIG. 1A. Air to be sampled passes through an inlet 10 and valve 11 into the particle chamber 12, and exits through an optical detector assembly 20, exit tube 18, a flow-limiting device 16 and pump 17. Flow enters the optical detector 20 through a focusing nozzle 13, wherein the flow is directed across a focused light beam 22, configured such that much of the scattered light is directed onto a photodetector 23. A pressure sensor 15 monitors the pressure upstream of a flow-limiting device 16. A controller 50 may be coupled to the respective valve 11, optical detector assembly 20, flow limiting device 16, pressure sensor 15 and pump 17 to enable the respective states of operation by operating these respective elements.

The Pulsed CPC 100 has two states of operation—purge and expansion—and continuously cycles between these two states. During the purge state, the inlet valve 11 is open, and the sample (air) flows through the particle chamber 12 and optical detector 20. The sample flow is exhausted through the pump 17. Pump 17 operates to pull the sample from the inlet 10 through device 100. In one embodiment, the inlet valve 11 controls access to the particle chamber through the inlet pathway for the sample air flow. Valve 11 is shown as a rotating valve in FIG. 1A and is shown open to allow passage of the sample through the device 100. As the valve rotates, it closes to prevent sample flow from inlet 10 into chamber 12. While shown as a rotating valve, valve 11 may also be a simple on/off solenoid valve, or an automated ball valve, or any other type of valve allowing or inhibiting flow through device 100. The flow-limiting device 16 controls the flow rate of the air sample in the device, and may be a simple orifice, or an orifice in combination with a vacuum regulator, or an active flow controller. In the purge state, ambient air flows through the particle chamber 12. Simultaneously, the device 100 measures direct light scattering from individual particles that have not been condensationally enlarged. Some will be sufficiently large to scatter a detectable amount of light and be counted. Depending on the optical configuration, the lower limit of detected particle size is around 0.3-0.5 μm.

The expansion state immediately follows the purge state. During the expansion state the inlet valve 11 is closed and the particle chamber 12 is partially evacuated through the optical detector 20 and exit tube 18 by pump 17. As air is removed from the particle chamber and optical detector, the pressure drops. The partial evacuation causes the air remaining within the chamber to expand. If the sampled air has been humidified, or if the walls of the particle chamber are wet, and if the expansion rate is appropriate, air within the particle chamber cools, initiating the formation of droplets around individual particles suspended in the air. During the expansion process, the droplets that have formed are carried through the nozzle 13, and through a focused light beam 22, and the individual droplets are detected and counted by means of the scattered light captured by a photo sensor 23. During the evacuation process, the pressure in chamber 12 is monitored by the pressure sensor 15, which is may be placed in particle chamber, in the optics detector 20, or in the exit tube 18 between the optical detector 20 and the flow-limiting device 16. The volume of air passing through the optical detector 20 at any moment is calculated from the pressure reading and the volume of the particle chamber 12. Typically, the expansion process occurs over a period of a few seconds, or less, and data are acquired at a rate of 16-64 Hz.

Figure 1B:
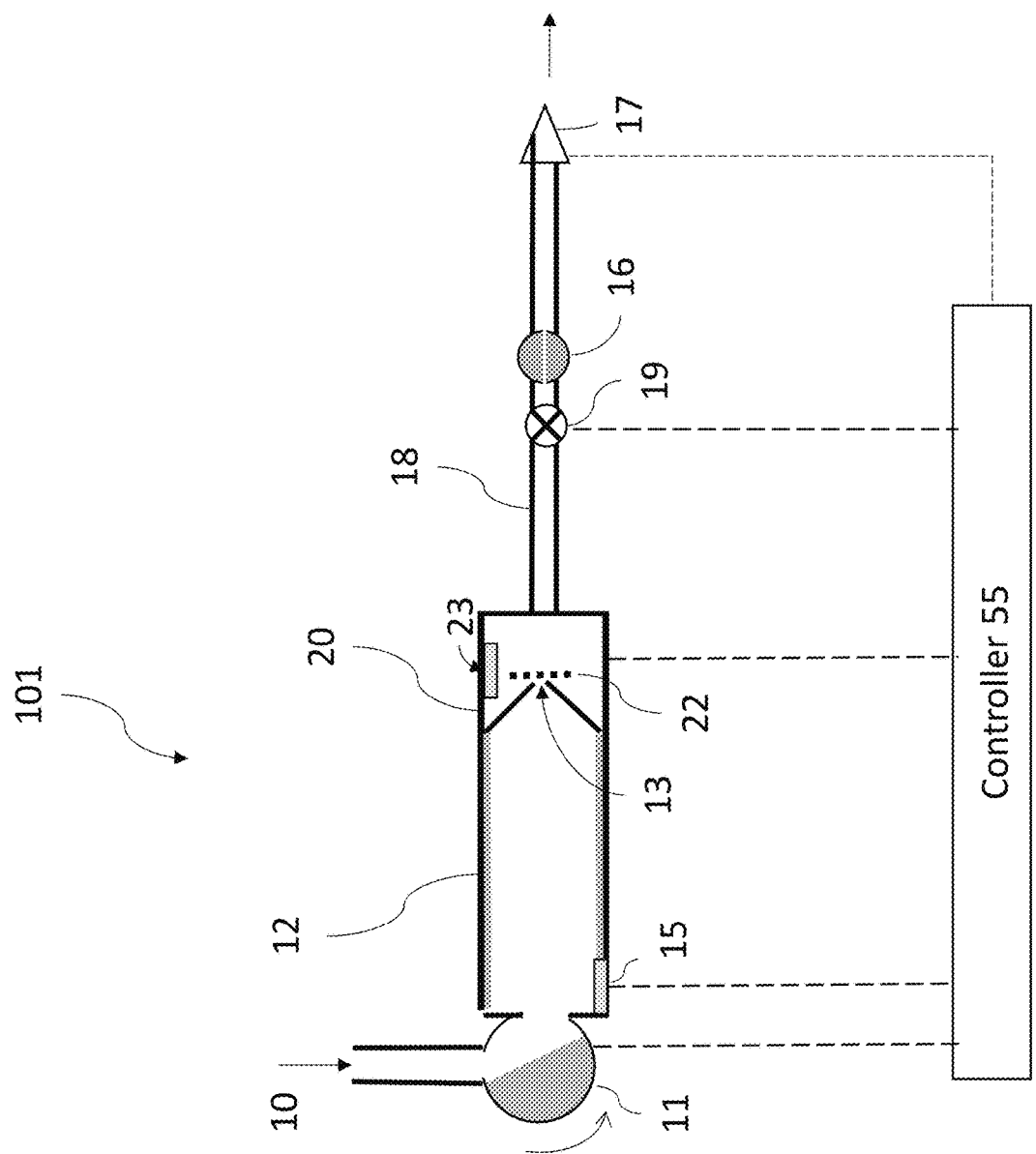
FIG. 1B shows a second embodiment of the Pulsed CPC with a second valve located on the flow path between the particle chamber and the pump.

The supersaturation achieved during the expansion process depends on the relative humidity of the sample at the onset of the expansion, as well as the expansion rate and the particle chamber geometry. To ensure consistent, high humidity value at the expansion onset, the flow can be humidified prior to introduction into the particle chamber, such as can be achieved with a commercial humidifier. Alternatively, humidification can be done within the particle chamber. If a portion of the walls of the particle chamber are lined with a wetted material, or if they are formed from a membrane comprising sulfonated tetrafluoroethylene based fluoropolymer-copolymer (Nafion™) that is in contact with water or high humidity air, then water vapor transport from these walls can humidify the air. FIG. 1B shows a second embodiment of the Pulsed CPC 101 with a valve 19 located on the exit flow path 18. In this embodiment the flow through the particle chamber can be completely stopped between the steps of purging and expansion.

Figure 1C:
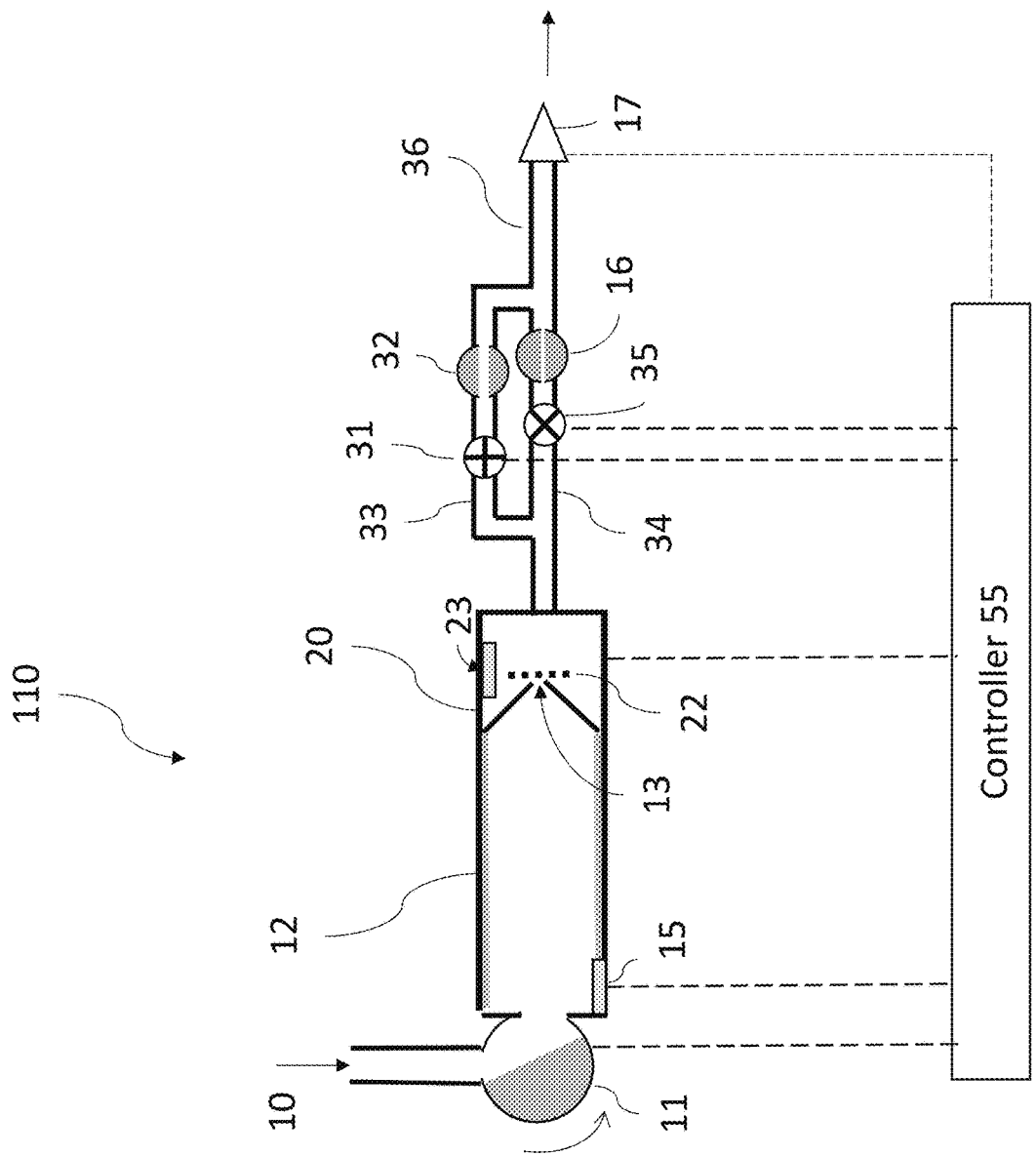
FIG. 1C shows a third embodiment of the Pulsed CPC with separate expansion and purge flow transport paths.

FIG. 1C shows a third embodiment which includes a separate expansion flow transport path 33 and purge flow pathway 34. The expansion rate can be controlled independently of the flow during the purge state by means of a secondary expansion pathway 33, which includes an expansion switching valve 31 and expansion flow limiting device 32. The flow-limiting device 32 controls the evacuation rate. This may be a simple orifice, or an orifice in combination with a vacuum regulator, or an active flow controller. Alternatively, a vacuum regulator may be placed immediately upstream of the pump 17, on exit tube 36, with appropriately sized orifices serving as the flow-limiting devices 16 and 32. The expansion pathway 33 may also include a ballast volume to aid in setting the desired evacuation rate. When operating with a particle chamber with wet walls, or with walls formed from a membrane that transports vapor but not liquid, such as sulfonated tetrafluoroethylene based fluoropolymer-copolymer (a commercial brand of which is Nafion™) surrounded by a water jacket, it may be desirable to allow the air within the chamber to humidify prior to expansion. This can be accomplished by isolating the chamber by closing the both valves 31 and 35, such that there is no flow through the chamber prior to the expansion. Alternatively, this may be accomplished by placing either valve 31 or valve 35 on the exit tube 36. A controller 55 may be coupled to the respective valves 11, 31 and 35, optical detector 20, flow limiting devices 16 and 32, pressure sensor 15 and pump 17 to enable the respective states of operation by operating these respective elements.

Each controller 50/55 may comprise a general purpose processor, special purpose processor or programmable circuit executing code adapted to cause the controller to perform the methods herein by controlling the various elements of each Pulsed CPC described herein. In one embodiment, the controller is a microprocessor with a custom firmware program. Data output from the Pulsed CPC may, or may not, be stored internally by the controller. The controller may output a data output stream for transmitting data to external storage for later analysis. In another embodiment, the controller may comprise an electrical circuit or circuitry coupled to the various elements of the Pulsed CPC which is configured to operate the Pulsed CPC to perform any of the methods described herein. It should be understood that elements of the Pulsed CPC may include additional circuitry such as circuitry to control a focused light beam 22 (which may comprise a laser or focused laser diode), circuitry to operate the photodetector 23 and process its output prior to input to the controller.

Figure 2:
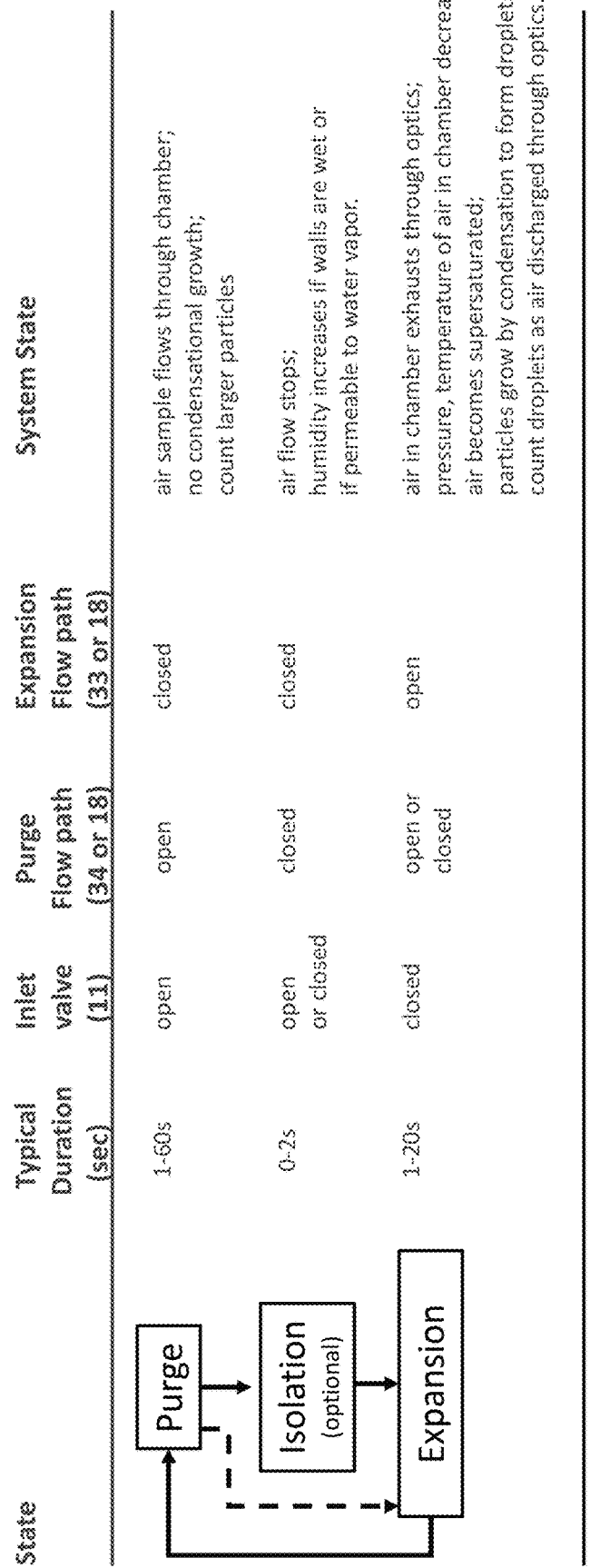
FIG. 2 illustrates the operational states of the Pulsed CPC.

FIG. 2 illustrates the operational states of the Pulsed CPC. Initially, in the Pulsed CPC is configured in the purge state, with the inlet valve 11 open, and the expansion valve 31, if present, is closed. Air flows through the particle chamber and exits through the optical detector. For configuration 100, the flow then exits through exit line 18. For configuration 110, which has two downstream flow paths, the flow exits through purge pathway 34 and exit line 36. There is no expansion, and no condensational growth during the purge state. Instead, airborne particles are carried by the flow, through the optical detector 20. Each particle will scatter light as it passes through the optical detector, but only some will be of sufficient diameter to scatter enough light to be detected by the optical sensor. Generally, the threshold for detection is larger than 300 nm, and can be as high as 2000 nm. Typically, most particles suspended in the ambient air are smaller than this threshold, and are too small to be detected. In normal operation the duration of the purge state is less than 60 seconds.

Subsequently, the Pulsed CPC transitions to the expansion state. This transition may be direct or may include an isolation state for a time of a few seconds duration. In the isolation state, the valves are closed to stop flow through the particle chamber. In configuration 110 the valves are configured to close flow through the purge line 33 and flow through expansion line 34, such as by closing valves 31 and 35. In configuration 100 there is no provision for an isolation state, but this could be accommodated by adding a valve on exit tube 18. The inlet valve 11 may be either open or closed. There is no flow through the particle chamber 12, and there is no evacuation of the particle chamber 12. If the walls of the particle chamber 12 are wet or formed from a material such as sulfonated tetrafluoroethylene based fluoropolymer-copolymer (NafiOn™), this isolation state allows the air within the particle chamber to be humidified. Alternatively, the isolation state may be bypassed, and the Pulsed CPC transitions directly to the expansion state.

In the expansion state the inlet valve 11 is closed, and flow through chamber 12, detector 20 and other elements to the pump 17 is open such that the air within the chamber 12 is partially evacuated through the optical detector 20. In configuration 100, this is accomplished by closing the inlet valve 11, such that the flow through exit port 18 becomes the expansion flow path. In configuration 101, this is accomplished by closing the inlet valve 11 and opening valve 19. In configuration 110, the inlet valve 11 is closed and the expansion valve 31 is open; valve 35 may be either open or closed. For either configuration 100, 101 or 110, in the expansion state air in the particle chamber is exhausted through the optical detector 20, the pressure within the particle chamber 12 decreases, and correspondingly the remaining air in the chamber expands. With the appropriate selection of the evacuation rate, this expansion approximates an adiabatic process, and the temperature of much of the air within the chamber decreases. The net effect of the expansion is to create super-saturated conditions within the particle chamber, such that particles present grow by water condensation, forming droplets. Typically, particles as small as 5-10 nm in diameter will be activated to grow, and the droplets formed are generally more than one micrometer in diameter. As the air from the chamber continues to discharge through the optical detector 20, each droplet scatters light, producing a pulse of light that is detected and counted. During the expansion state the pressure inside the particle chamber 12 drops from an initial value close to the ambient air pressure, typically 1 atmosphere, to a final pressure in the range of 0.2 to 0.8 atmospheres. Once reaching the final pressure the expansion valve 35, if present, is closed, and the inlet valve 11 is opened, returning the instrument to the purge state. The adiabatic expansion of a volume of air that is nearly saturated (>90% RH), leads to super-saturated conditions. This is due to the decrease in temperature inside the volume as the flow expands, combined with the non-linear character of the saturation vapor pressure. During the adiabatic expansion both the temperature and the vapor pressure drop. The saturation vapor pressure, which is only a function of the temperature, also drops, and because the saturation vapor curve is non-linear, the saturation vapor pressure drops more quickly than does the vapor pressure, resulting in supersaturated conditions. This supersaturation persists until the flow warms due to non-adiabatic effects, i.e. heat transfer from the walls of the container. Very high supersaturations may be achieved with this approach, making the activation of growth of particles as small as a few nanometers feasible.

The Pulsed CPC of this technology can be operated with either dry, or wet walls. For operation with dry walls, higher supersaturations are achieved when humidifying the air prior to expansion. This is achieved by humidifying the air stream as it is introduced. Alternatively, it is achieved by forming the walls of the particle chamber 12 with a sulfonated tetrafluoroethylene based fluoropolymer-copolymer membrane, the opposite side of which is in contact with water or high humidity air, and waiting a brief moment between closing the inlet valve and opening the expansion valve, such that the flow becomes humidified prior to expansion. When operating with wet walls, as may be obtained by lining the walls with a wetted wick, the condensational growth is enhanced. With the wet walls, both heat and water vapor diffuse into the flow when the flow is expanded, but the vapor diffusion is more rapid. Under this circumstance, the supersaturation is created through a combination of the cooling from adiabatic expansion and the transport of water vapor from the walls.

The evolution of the saturation profiles within the particle chamber 12 during the expansion process, as calculated using Comsol Multiphysics®, a commercial finite element heat and mass transfer model available from Comsol, Inc. Using this tool, one solves the time-dependent differential equations for water vapor concentration c and temperature T:

$$\frac{\partial c}{\partial t} = \nabla \cdot (D\nabla c) - \nabla \cdot (uc)$$

$$\rho C_p \frac{\partial T}{\partial t} = \nabla \cdot (k\nabla T) - \rho C_p u \cdot \nabla T + \alpha_p T\left(\frac{\partial p}{\partial t} + u \cdot \nabla p\right)$$

where D the mass diffusivity of water vapor, u is the flow velocity obtained from solving the Navier Stokes equations. k, $\rho$, $C_p$ and $\alpha_p$ are the thermal conductivity, density, constant pressure heat capacity and compressibility of air.

Figure 3:
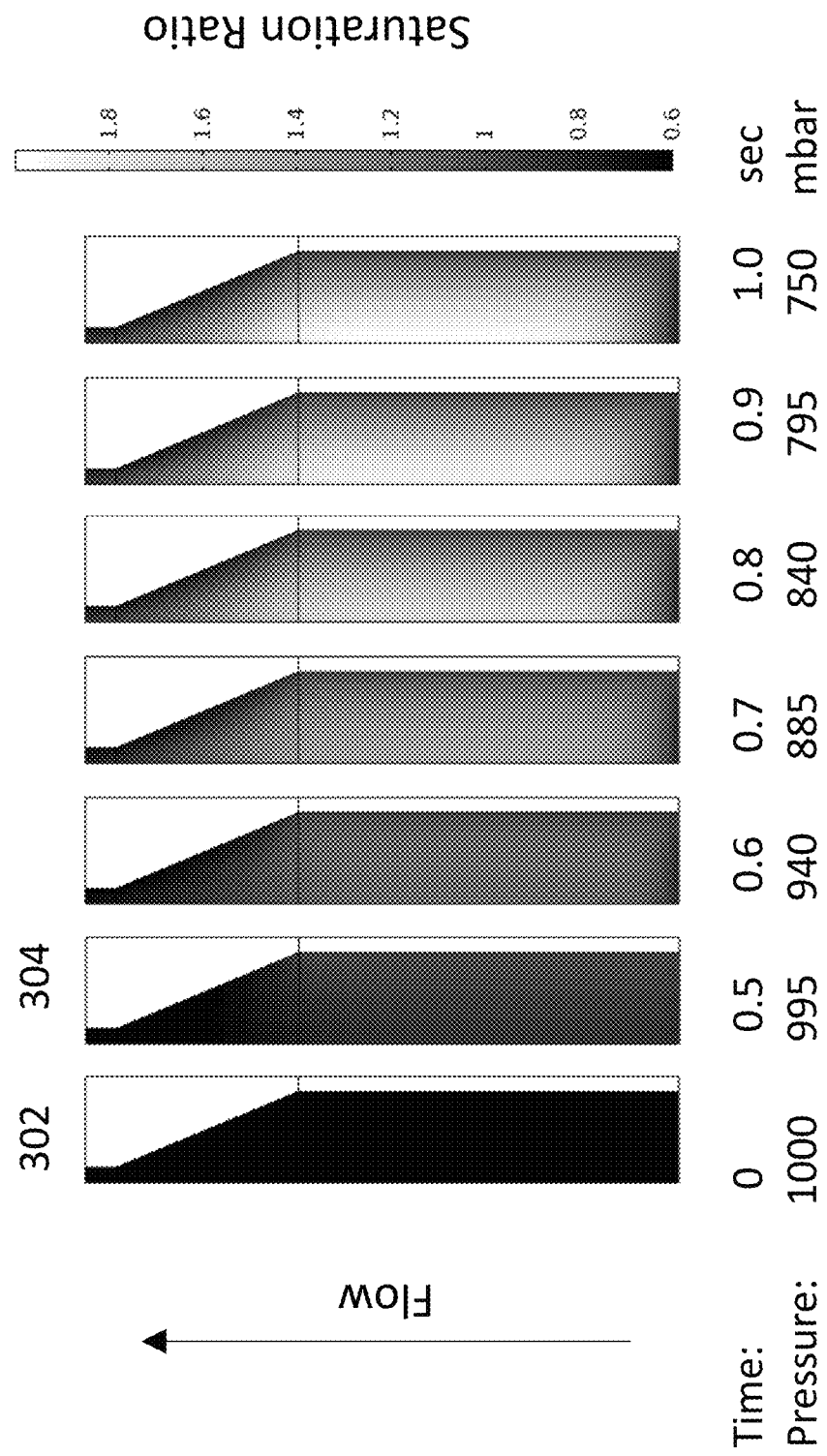
FIG. 3 is a display of the modeled saturation ratio within a Pulsed CPC particle chamber and its downstream focusing nozzle during the isolation and expansion steps, where the isolation is 0.5 s, and the expansion is from 1000 to 750 mbar over 0.5 s, and when the walls of the particle chamber are wet, and the initial relative humidity of the air is 50%

This model can be applied to several geometries for the particle chamber, and particle chambers of varying dimensions, with wet walls, and with dry walls. FIG. 3 shows the results for a 12-mm diameter wet-walled particle chamber of FIG. 1B. The sampled air is at 50% RH and 25° C., and the nozzle 13 has dry walls. The inlet valve is at the bottom (not shown), and during expansion the flow is upward. These 7 images show the calculated saturation ratio as it evolves during a 0.5 s purge followed by a 0.5 s expansion. Each image is a result for one-half of the tube, with the centerline on the left edge of the image (because the system is cylindrically symmetric, only one half is modeled). Grayscale indicates the saturation ratio, with dark for S=0.5, and white for S>1.8. At time t=0 s the inlet valve 11 and transport flow valve 19 are shut. The first image 302 shows starting conditions of 50% relative humidity throughout, while the second image 304 shows the increase to near 100% as water vapor diffuses into the chamber from the wet walls. At t=0.5 s, the transport flow valve 19 is opened to evacuate the particle chamber. The pressure in the particle chamber decreases exponentially with time, as would happen for constant volumetric flow, with a pressure drop of 250 mbar within the chamber during the subsequent 0.5 s (0.5 s<t<1 s). During the expansion, the temperature within the core of the chamber drops due to mechanical work, creating supersaturated conditions throughout the length of the tube. The increase in the saturation ratio throughout the expansion is due both to the drop in temperature and water vapor transport from the walls. The simultaneous heat and water vapor which are transported from the walls enhances the supersaturation because the mass diffusivity of water is higher than the thermal diffusivity of air. In this example, the saturation ratio reaches 1.95 in the core of the flow (T=10.6° C.), which corresponds to a Kelvin diameter of 3.4 nm.

Figure 4:
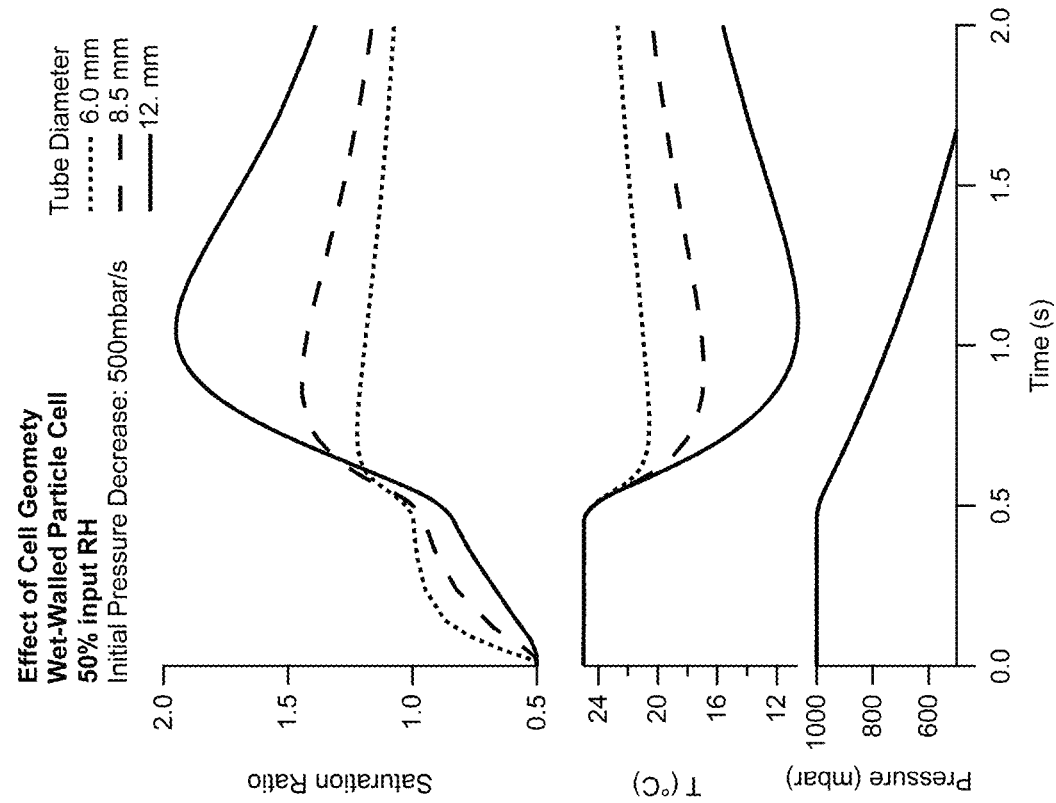
FIG. 4 is a graph of pressure, temperature and saturation ratio, vs. time and shows results of model calculations of temperatures and saturation ratio at the centerline of a nozzle entrance for varying particle chamber diameters for a fixed expansion rate (mean of ~500 mbar/s) when the walls of the particle chamber are wet, and the relative humidity input into the chamber is 50%.
Figure 5:
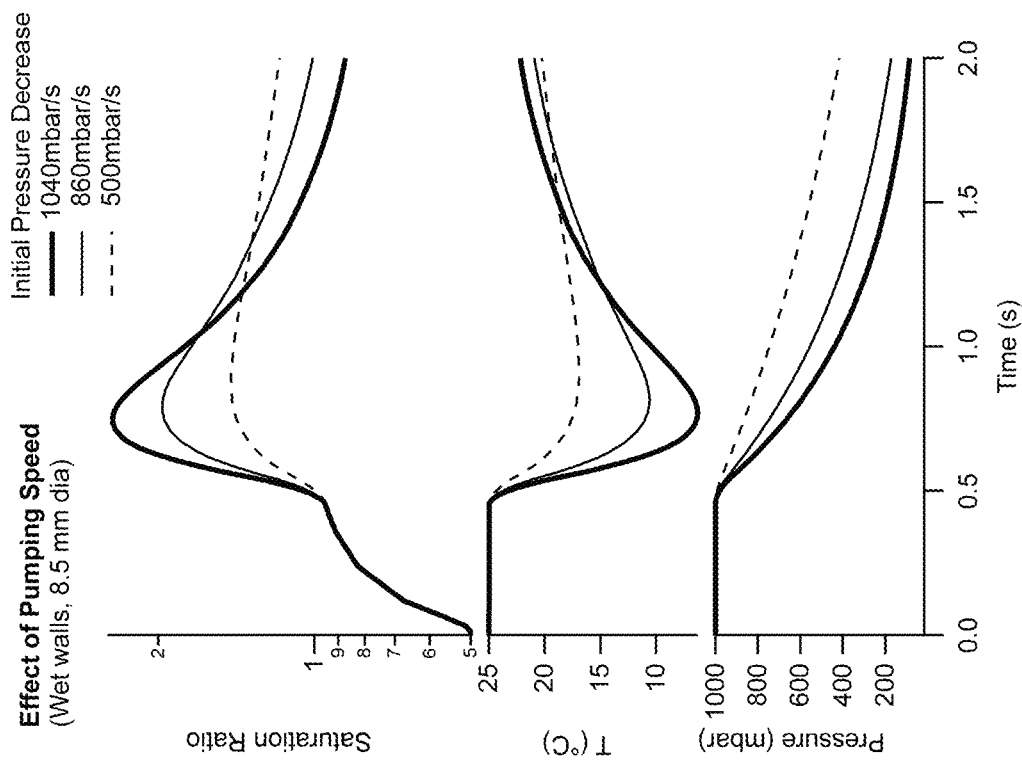
FIG. 5 is a graph of pressure, temperature and saturation ratio, vs. time and shows results of model calculations of temperatures and saturation ratio at the centerline of a nozzle entrance at varying expansion rates for fixed particle chamber geometry of an 8.5 mm diameter cylinder with wet walls.

To quickly map the dependence on geometry and expansion rate, one may extract from the two-dimensional model the temperature and saturation ratio at one point, at the centerline of the nozzle entrance. The time evolution of the temperature and saturation at this one point allows comparison of different scenarios, with differing chamber geometries, wall conditions and expansion rates. FIG. 4 shows this comparison for wet-walled particle chambers of varying geometric proportion, operated at equal expansion rates. Shown are results for cylindrically shaped particle chambers of diameters of 6.0 mm, 8.5 mm and 12 mm. The input air sample is initially at 50% RH. At time t=0 s the flow is stopped by closing the flow to the pump 17 by closing valve 19 (or valves 31 and 35) and closing the inlet valve 11, and the humidity of the air within the chamber increases due to diffusion from the wet walls. At time t=0.5 s, the inlet valve 11 is closed, and the pressure and temperature inside the particle chamber 12 drops. The modeling shows that lower temperatures, and higher peak supersaturations, are achieved with wider diameter tubes, as the heat transfer from the walls becomes less important. FIG. 5 examines the effect of the expansion rates for a wet-walled, 8.5 mm diameter particle chamber. In this embodiment, lower temperatures, and hence higher supersaturation are achieved at the higher expansion rates. The expansion rate is indicated by the initial rate of pressure decrease, in mbar/s.

Figure 6:
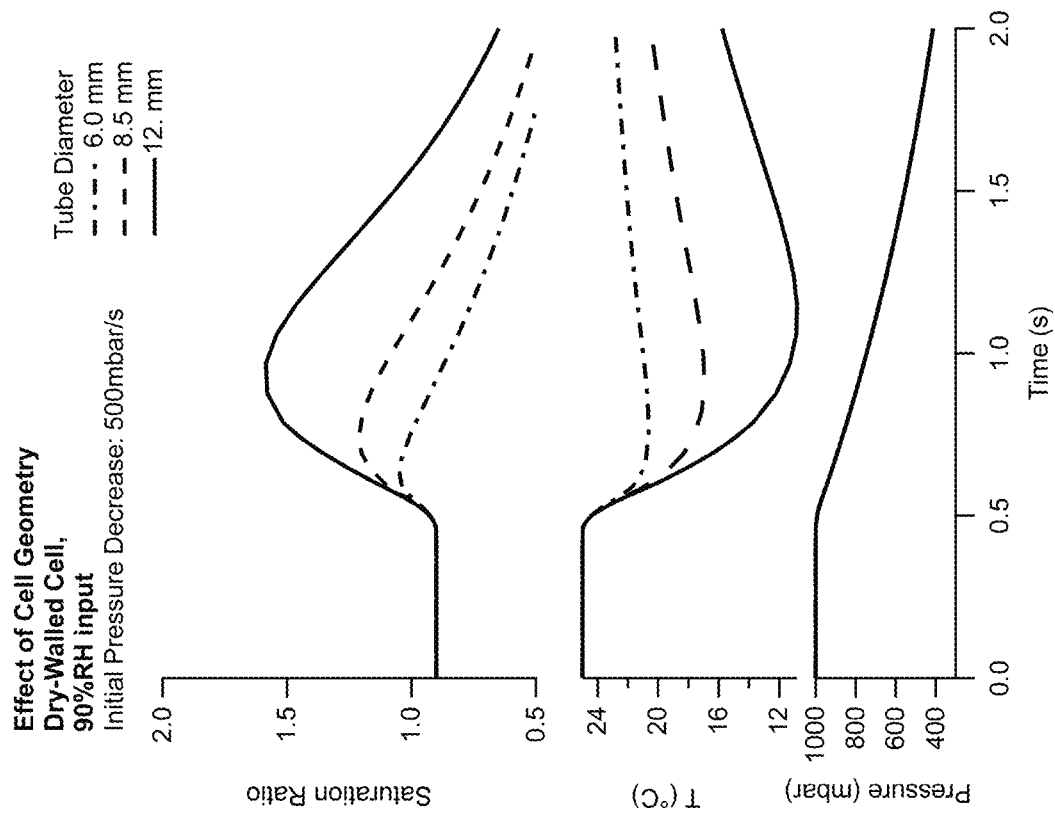
FIG. 6 is a graph of pressure, temperature and saturation ratio, vs. time and shows results of model calculations of temperatures and saturation ratio at the centerline of the nozzle entrance for varying particle chamber geometries for a fixed expansion rate (mean of ~500 mbar/s) when the walls of the particle chamber are dry, and input air is at 90% RH before the expansion.

FIG. 6 shows the calculated super-saturation achieved through expansion when the particle chamber walls are dry. Again, modeling is for a cylindrically-shaped particle chamber with diameters of 6.0 mm, 8.5 mm and 12 mm. The expansion starts at time t=0.5 s, and the input air sample is at 90% RH prior to the expansion. The temperature profile is essentially the same as obtained at the same expansion rate (500 mbar/s), but the supersaturation achieved is lower. This indicates an enhancement in the saturation achieved by wetting the walls of the particle chamber. The enhancement over that achieved from expansion alone is due to the water transport from the walls.

Figure 7:
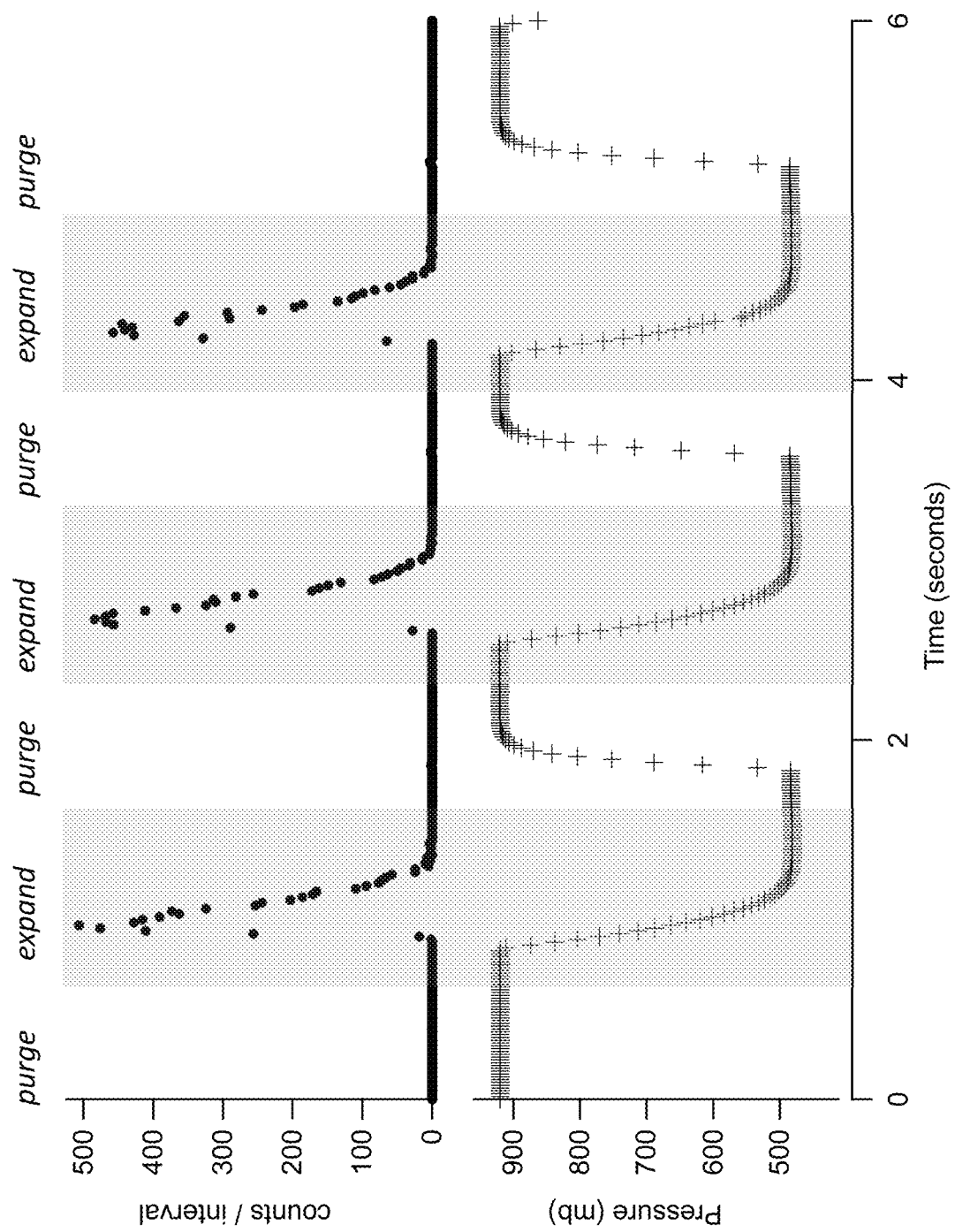
FIG. 7 is a graph showing raw particle count and pressure data from a Pulsed CPC, where the overlay indicates the alternating purge and expansion steps.

The operational principal of the Pulsed CPC has been verified experimentally. Data were obtained with a particle chamber coupled to a commercial optical detector, and with solenoid valves on the inlet and on the expansion pathway. FIG. 7 shows raw data obtained with a cylindrically shaped, 6-mm diameter particle chamber with a volume of 3 cm³ and wet walls. This figure illustrates the cycling between purge and expansion modes. Displayed are measurements of the particle chamber pressure and the number of droplets detected in each measurement interval. Data were recorded at 64 Hz, i.e each measurement interval is ¹⁄₆₄ s. The sample was drawn from the ambient air in the room.

Referring to FIG. 1B, in the purge mode, the inlet valve 11 and the exit flow pathway valve 19 are open. The pressure in the particle chamber 12 is constant, and essentially no particles are detected. This is because there are too few particles of sufficient size to be seen by the optical system employed. In the expansion mode the inlet valve 11 is closed, and the exit pathway valve 19 is opened, and the pressure in the particle chamber 12 drops. With each expansion state cycle, a burst of particles, or droplets, are seen by the optical detector. As the flow expands, and cools, the droplets passing through the nozzle 13 into the optical detector 20 are counted. To verify that this burst of particles was not generated from the closure of the inlet valve, the measurement was repeated with filtered air, and no particles are detected.

Figure 8D:
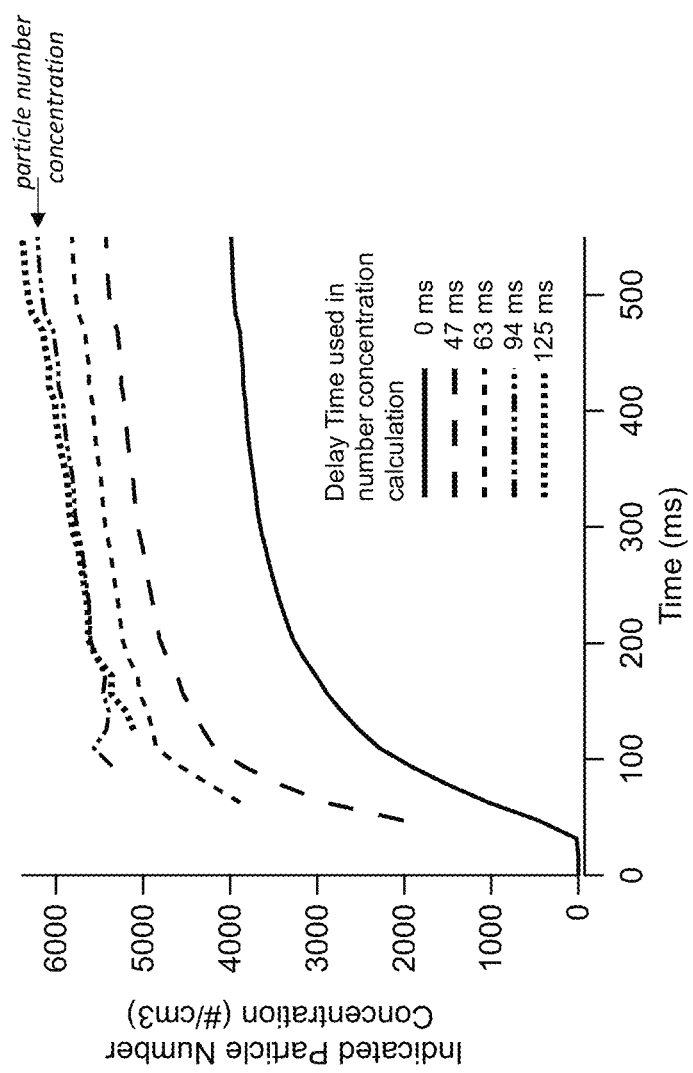
FIG. 8D is the particle number concentration calculated from the number of detected droplets and volume of air sampled after a delay time of 0 ms to 125 ms.

FIGS. 8A-8D illustrate how these data are processed to retrieve the ambient particle number concentration. Data are taken from the first expansion cycle of FIG. 7. The sampled volume—the volume of air that has passed through the focusing nozzle 13 into the optical detector 20 since the beginning of the expansion—is calculated from the pressure reading and the volume of the particle chamber 12, as shown in FIG. 8A. Specifically, the sampled air volume is estimated as $(1-P/P_o)*V_o$, where $V_o$ is the particle chamber volume, P is the pressure measured at the moment of the reading, $P_o$ the pressure before the expansion, and $V_o$ is calculated from the mechanical drawings of the system. This calculation ignores the temperature change (which is less than ~3% based on modeling). Then, the total number of particles detected during each expansion state is summed, as shown in FIG. 8B. The ratio of the number of detected particles to the sampled air volume is the indicated particle number concentration is shown in FIG. 8C. During the expansion state the indicated particle concentration rises, and then plateaus. The plateau value indicates the measured particle concentration.

Close inspection of the data in FIGS. 8A and 8B reveals a delay of about 46 ms between the moment the pressure in the particle cell starts to decrease, and the first detection of particles. This is due to the time required for the saturation ratio within the particle chamber to rise, and for the droplets formed by the condensation of water onto the particles to grow to detectable size. For this reason, the particle number concentration is more accurately indicated by introducing a delay before summing the number of particles and calculating the sampled air volume.

FIG. 8D compares the particle number concentration derived from the data of FIGS. 8A and 8B obtained assuming no delay (as in FIG. 8C) to that obtained using delay times of 47 ms, 63 ms, 94 ms, and 125 ms. Specifically, the number concentration is calculated as $$N(t)=(\text{CountSum}[t]-\text{CountSum}[t_{delay}])/(\text{CumVol}[t]-\text{CumVol}[t_{delay}])$$

Where t is time since the onset of the expansion, $t_{delay}$ is the delay time (eg 46 ms, 62 ms from the onset of the expansion, CumVol[t] is the cumulative amount of air that has exited the particle chamber from the onset of the expansion until time t, expressed as volume at the initial temperature and pressure, and CountSum[t] is the sum of detected particle counts from the beginning of the expansion until time t. CountSum [$t_{delay}$]) and CumVol[$t_{delay}$] are these two parameters evaluated at the delay time $t_{delay}$. CumVol is shown in FIG. 8A, and CountSum is shown in FIG. 8B.

As illustrated in FIG. 8D, utilizing a delay time of 46 ms, corresponding to the observed delay between the onset of the expansion and the initial detection of particles, results in a higher indicated particle concentration. Longer delay times of 62 ms and 94 ms further increase the indicated particle concentration. However, further delay, as in the 125 ms shown in FIG. 8D, gives essentially the same result as for the 94 ms delay. Thus, consistent data are obtained using the 94 ms delay time. We find that for a fixed particle chamber geometry and expansion rate, the optimal delay time, evaluated as that which is just long enough to yield the same result as a longer delay, is the same for all pulses. Thus, once this is determined through detailed examination, the same value can be applied throughout the data reduction.

Figure 9:
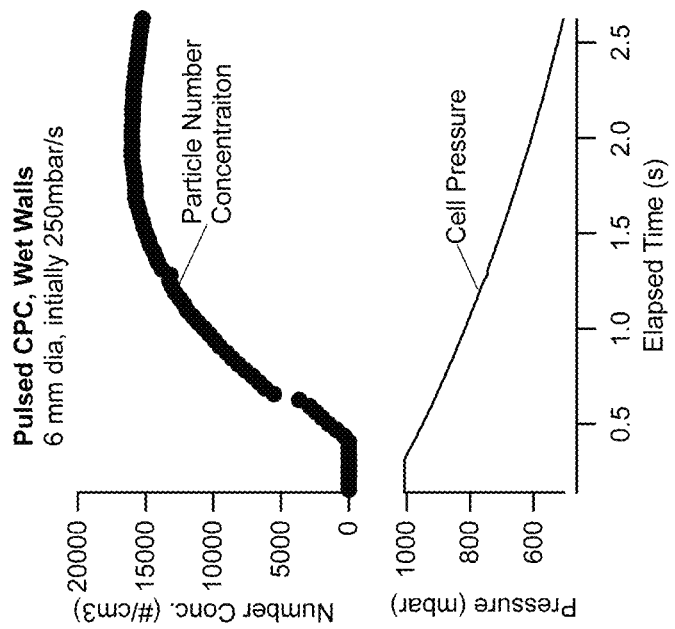
FIG. 9 is a graph of the showing the pressure in the particle chamber and detected particle concentration versus time during a single expansion of a wet-walled, 6 mm diameter particle chamber.
Figure 10:
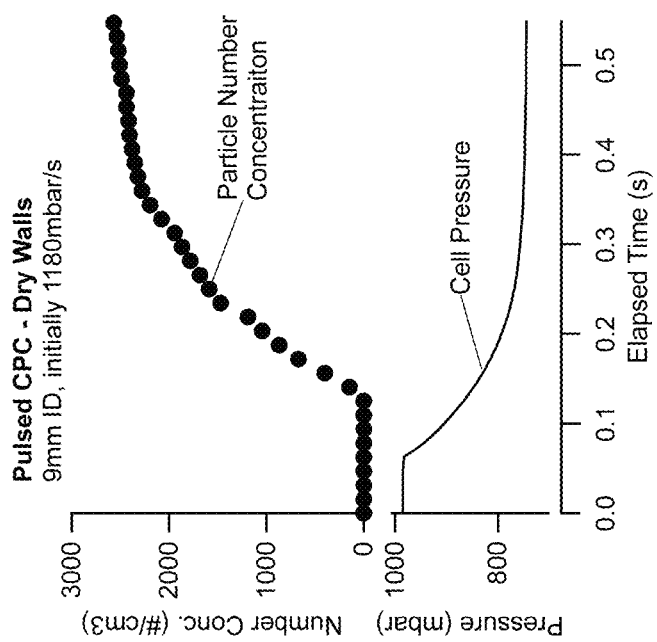
FIG. 10 is a graph of pressure, and particle concentration vs. time and shows the pressure in the particle chamber and detected particle concentration during a single expansion of a dry-walled, 9 mm diameter particle chamber.

Particle detection is possible with either wet-walled or dry walled particle chambers. When using a wet-walled chamber, the humidification prior to expansion is provided by the walls themselves. When using a dry-walled chamber, humidification of the air sample prior to expansion is needed. FIG. 9 shows the indicated particle concentration from a single pulse obtained with a narrow, cylindrically shaped, wet-walled particle chamber with a diameter of 6-mm, and a volume of 3 cm$^3$. FIG. 10 shows analogous data obtained with a dry-walled, 9-mm diameter particle chamber. Both wet-walled and dry-walled approaches produce particle counts, although the dry-walled configuration required a wider tube, and a larger expansion rate.

Figure 11:
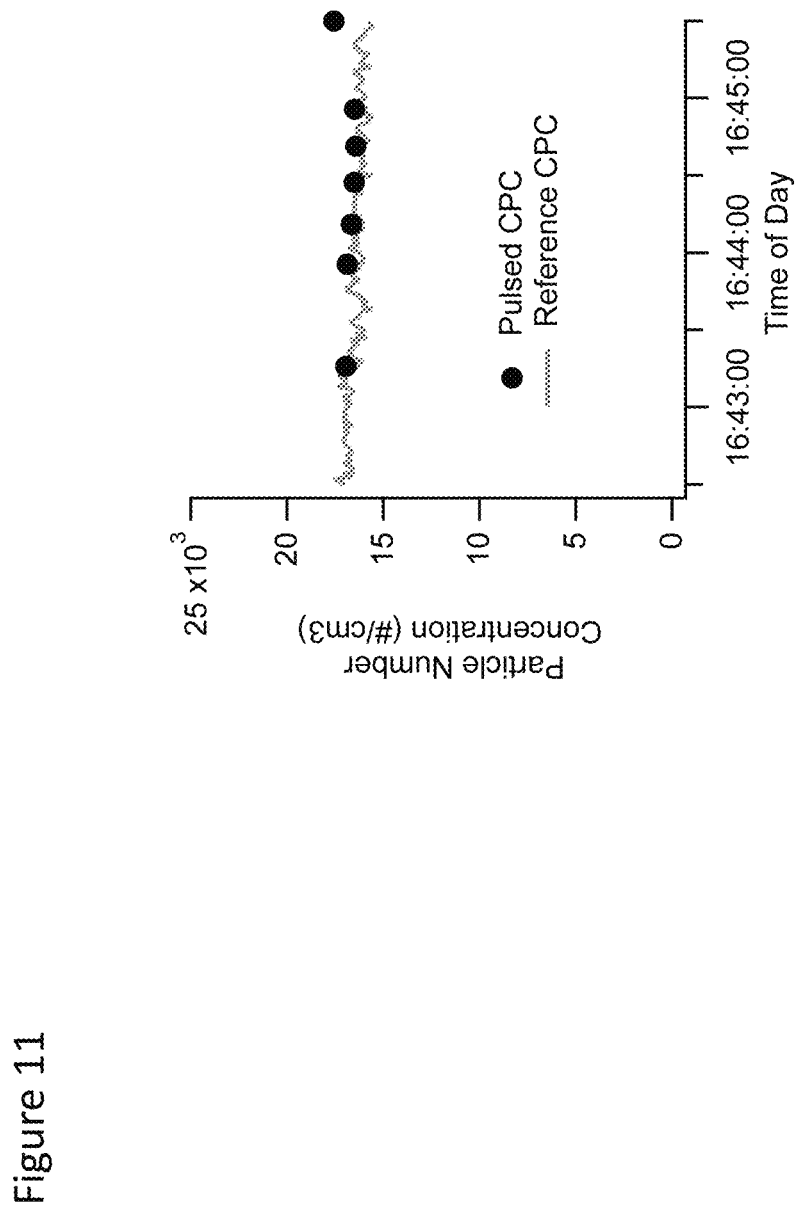
FIG. 11 is a graph of particle concentration vs. time and shows particle concentration as measured by the Pulsed CPC as compared to a benchtop, commercial condensation particle counter, for sampling ambient air.

Comparisons to a benchtop condensation particle counter are shown in FIG. 11 for sampling ambient air. Data are from the 6-mm diameter, wet-walled system. The Pulsed CPC approach yields a particle number concentration within 10% of a benchtop condensation particle counter that has a nominal threshold of 5 nm.

Figure 12:
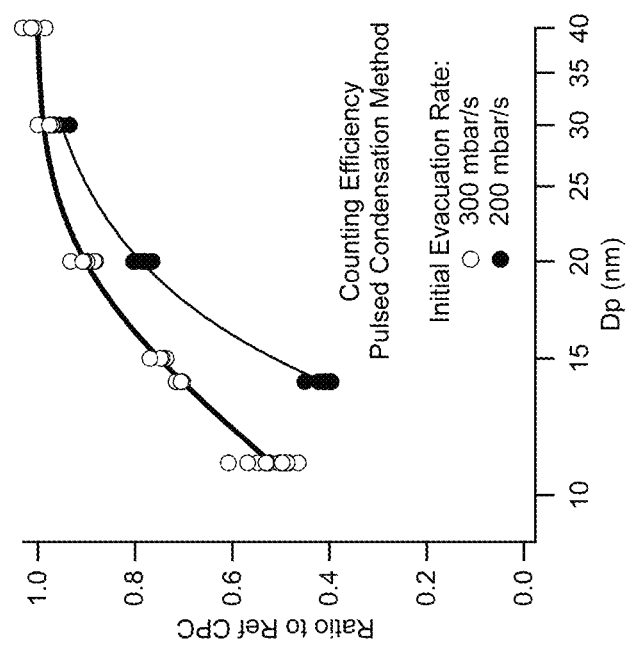
FIG. 12 is a graph showing measured detection efficiency of a Pulsed CPC as a function of particle size at two different expansion rates.
Figure 13:
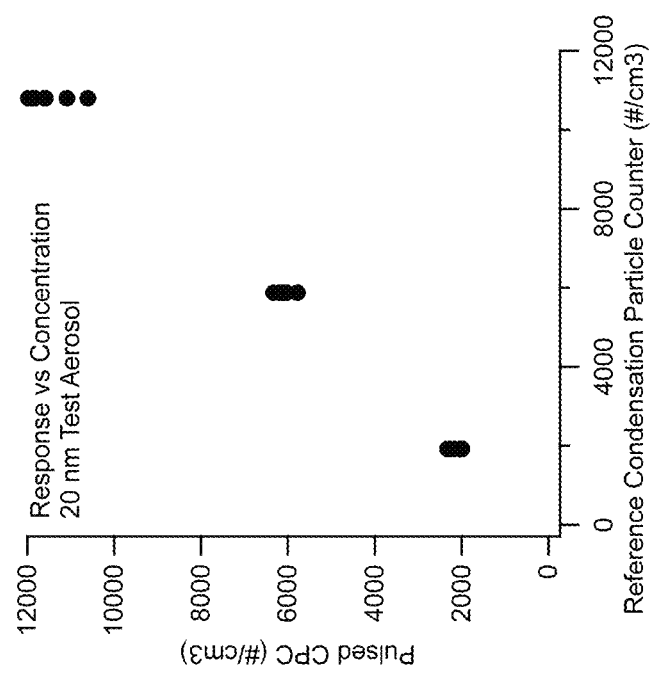
FIG. 13 is a graph comparing the response of a Pulsed CPC to a benchtop condensation particle counter for 20 nm sulfate aerosols over a range of particle concentrations.

FIG. 12 presents calibration for a Pulsed CPC system showing particle-size dependent detection efficiency. Data were obtained using monodisperse ammonium sulfate aerosol generated by atomization, dried, charge equilibrated, and size classified using a differential mobility analyzer (TSI). The reference is a TSI Model 3789 versatile water condensation particle counter, configured for 2 nm particle detection. For our Pulsed CPC approach, concentrations are calculated from the maximum reading from each pulse, as described above. Detection efficiency as a function of particle size are shown for two different expansion rates, with the higher evacuation rate exhibiting a 50% detection at 10 nm in particle size. FIG. 13 shows the response for varying concentrations of 20 nm test particles, showing agreement within 15% of the reference instrument over a wide range in particle concentrations.

Figure 14:
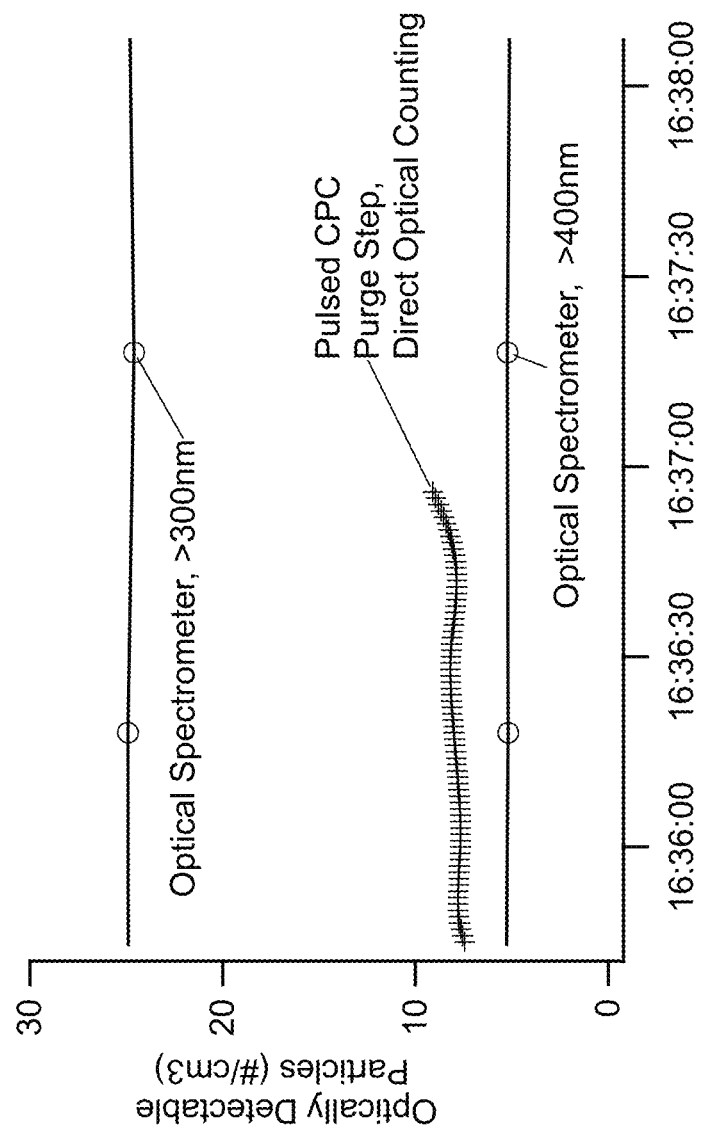
FIG. 14 is a graph comparing the response of the Pulsed CPC during the purge state to a commercially available benchtop optical particle spectrometer, which has a threshold at particle diameters of 300 nm and 400 nm.

FIG. 14 shows data from the Pulsed CPC during the purge cycle, with comparison to a commercial optical particle spectrometer (such as one manufactured by Climet Instruments, Redlands Calif.). During the purge cycle there is no condensational growth, and ambient particles pass through the optical detector without condensational enlargement. Those particles larger than about 300-400 nm scatter sufficient light to be counted without condensational enlargement, and these are counted directly. In this mode, the Pulsed CPC acts simply as many optical particle spectrometers, counting and sizing particles based on the directly scattered light. Typically, these counters detect only those particles larger than 300-400 nm. In the purge mode the Pulsed CPC provides data similar to other commercial optical particle spectrometers. This added measurement enables a dual-use instrument which can act as both a condensation particle counter for total particle number, and an optical sensor for counting and sizing ambient particles above a 300-400 nm threshold. This latter measurement is what is used by current low-cost sensors to track $PM_{2.5}$ mass. This offers the advantage of two types of measurements in one instrument.

Figure 15:
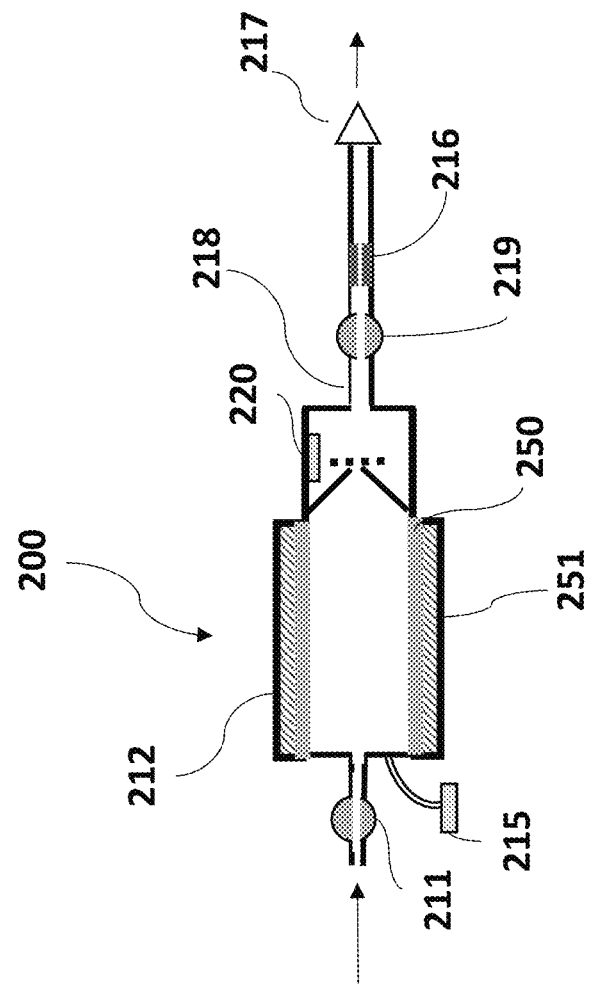
FIG. 15 is a schematic of the Pulsed CPC configured with sulfonated tetrafluoroethylene based fluoropolymer-copolymer walls surrounded by a water jacket.

FIG. 15 illustrates a Nafion-walled Pulsed CPC, 200. This implementation has a particle chamber 212 including walls formed from sulfonated tetrafluoroethylene based fluoropolymer-copolymer (Nafion™) film 250 surrounded by a water jacket 251. The particle chamber 212 is immediately joined to an optical detector 220. Air enters the particle chamber through inlet valve 211 and exits through the optical detector 220 along exit path 218 to pump 217. This implementation includes a port leading to a pressure sensor 215, exit valve 219, and restriction 216.

FIG. 16A is a cut-away view of a Nafion-walled particle chamber 312 and optical detector 320. The particle chamber is a 50-mm long cylinder with an internal diameter of 17 mm. The Nafion membrane 360 is formed from a nominal 0.7-inch diameter Nafion tube material from PermaPure (Toms River, N.J.), and is supported by a rigid cage 361 (FIG. 16B) to prevent collapse upon pressure changes. A water jacket 362 surrounds much of the Nafion. The o-ring 363 presses against the Nafion and the end cap to provide a seal. Port 371 connects to an inlet valve, and port 372 connects to a pressure sensor. The particle chamber is connected to the optical detector 320 through nozzle 313.

Figure 17:
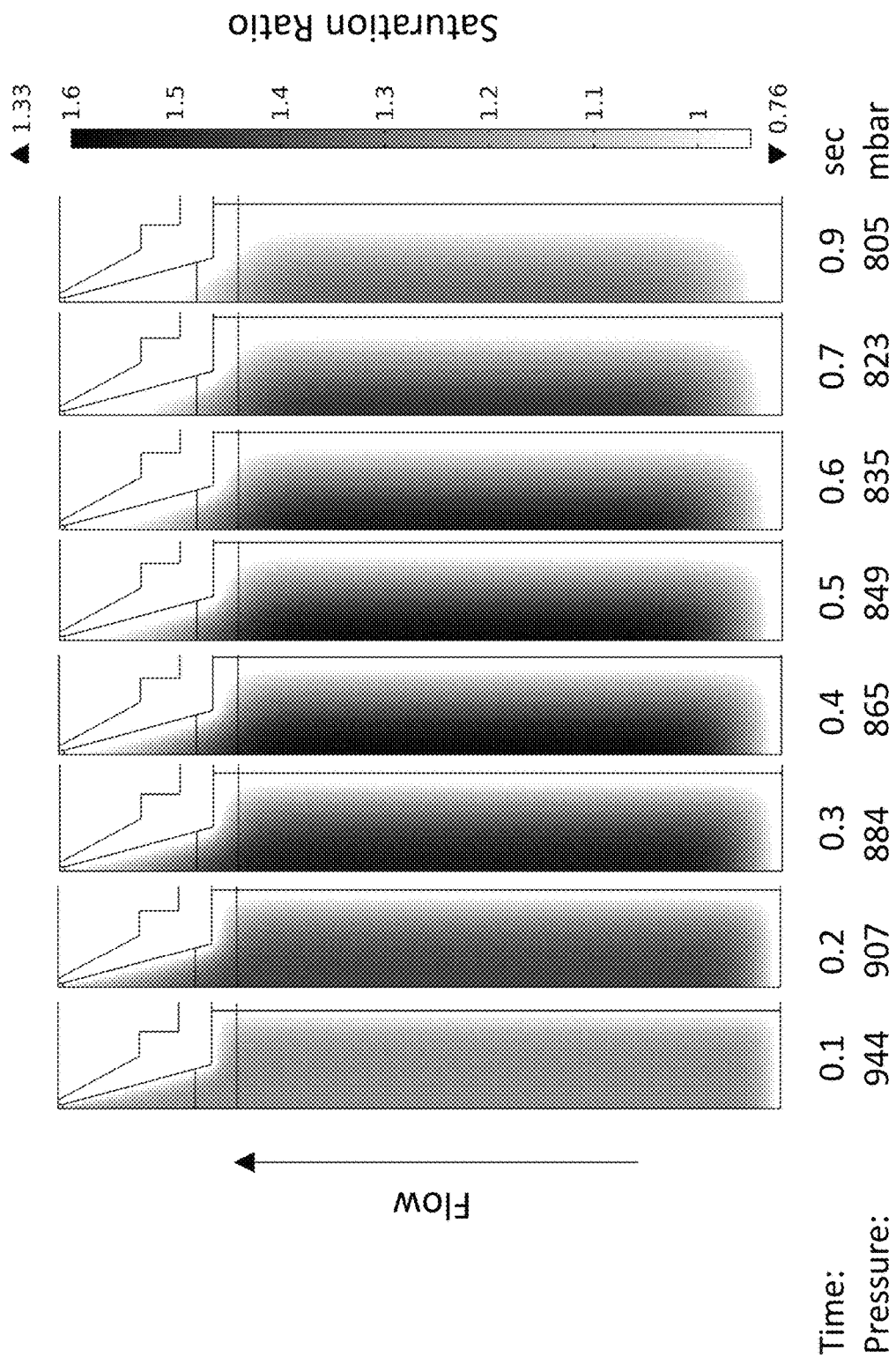
FIG. 17 is a display of the modeled saturation ratio within a Pulsed CPC particle chamber and its downstream focusing nozzle during the expansion from 1000 to 750 mbar over when the walls of a 17-mm diameter particle chamber are dry, and the initial relative humidity of the air is 95%.

Referencing FIGS. 2 and 16A, the Nafion-walled Pulsed CPC 200 was operated with a 4 s purge step, (valves 211 and 219 both open), a 4 s isolation step (valves 211 and 219 both closed) and a 2 s expansion step (valve 211 closed, valve 219 open). The internal volume of the particle chamber is about 12 cm$^3$. The pump provided an absolute pressure in the range of 700-800 mbar, and the restriction 216 limited the maximum flow to about 0.8 L/min. FIG. 17 shows the time-dependent, spatial distribution of the saturation ratio under these operating conditions. This is presented as a sequence of images, in 100 ms steps from the onset of the expansion. The centerline is at the left-hand edge of each image. These are calculated using a numerical model that includes heat transfer from the walls, as well as cooling from the expansion, and assumes 95% humidity prior to expansion. The maximum saturation ratio of about 1.5 is reached 400 ms after the onset of the expansion and extends along the centerline over most of the length of the chamber. This sufficient to activate the condensation of water vapor onto a 4 nm, insoluble but wettable particle.

Figures 18A, 18B:
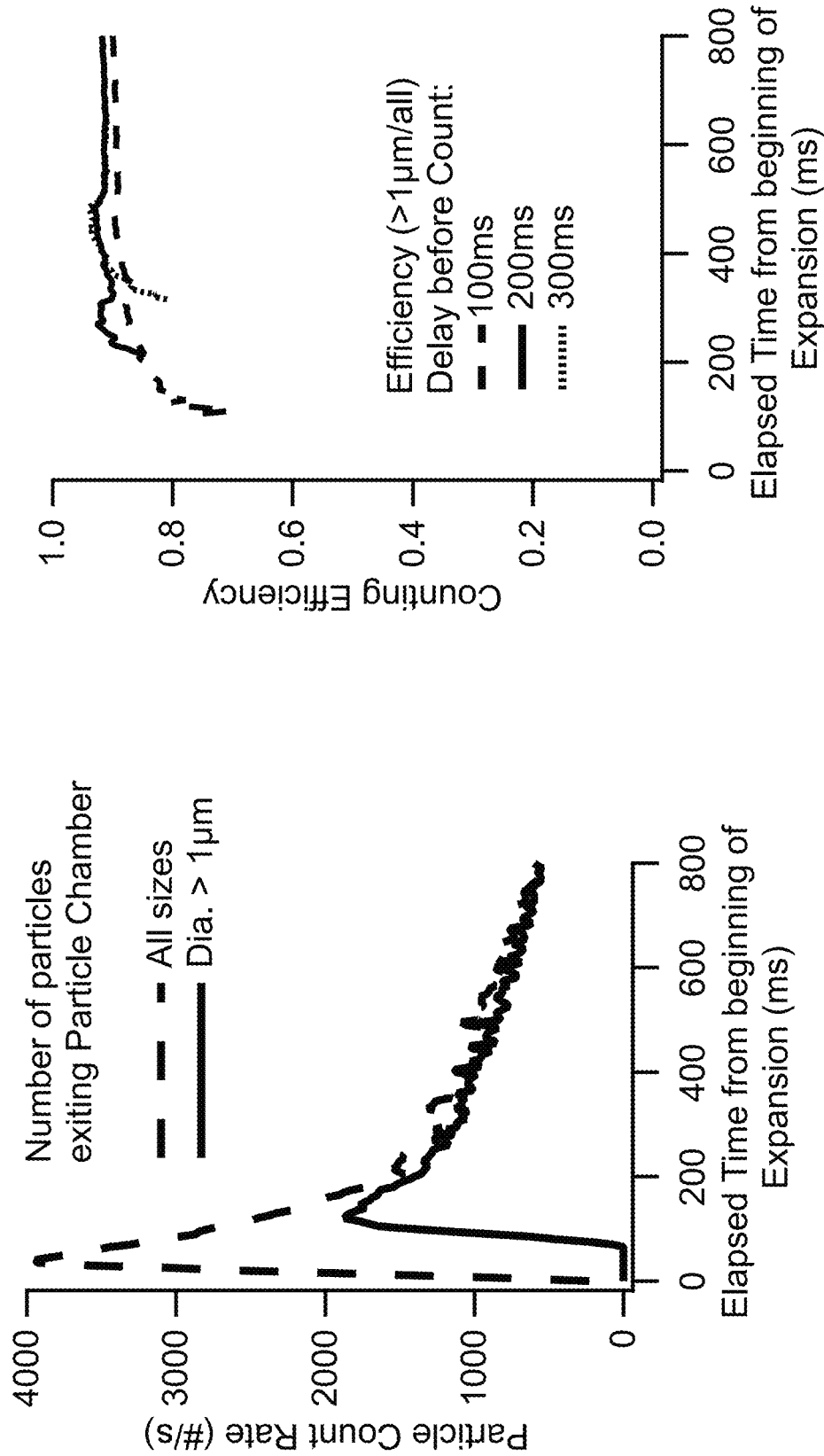
FIG. 18A shows the time dependence of the modeled number of particles of all sizes, and those that have grown to at least 1 μm, which exit particle chamber when the initial concentration of particles in the chamber is 450 particles/cm3.
FIG. 18B is the modeled detection efficiency, taken as the ratio between the number of particles and the air volume that have exited the particle chamber after a delay of 100-300 ms.

Once the condensational growth on a particle is initiated, it will grow, reaching a diameter of one or more micrometers. The numerical model is used to calculate this growth, and to calculate what fraction of the particles have grown to detectable size of at least 1 μm at the point the particle enters the optical detector. This fraction is the counting efficiency. FIG. 18A shows the rate at which particles enter the optical detector, as well as the rate for those larger than 1 μm. Initially, most particles are not activated, or not large enough to be detected. But after 200 ms, 90% of the exiting particles are large enough to be detected. FIG. 18B shows the modeled counting efficiency derived from summing the counts after a delay of 100, 200, or 300 ms, with the result that 200 ms and 300 ms delays both yield efficiencies above 90%. Calculations (not shown) for delays of 400 ms and 600 ms also yielded this same high efficiency.

Figure 19B:
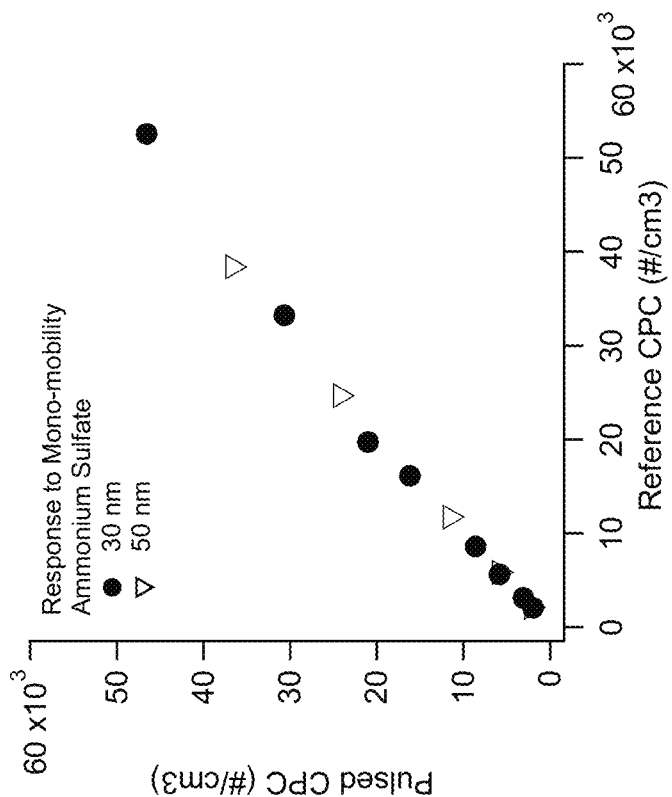
FIG. 19B is the measured detection efficiency of the embodiment of the Pulsed CPC of FIG. 16 vs particle concentration.
Figure 19A:
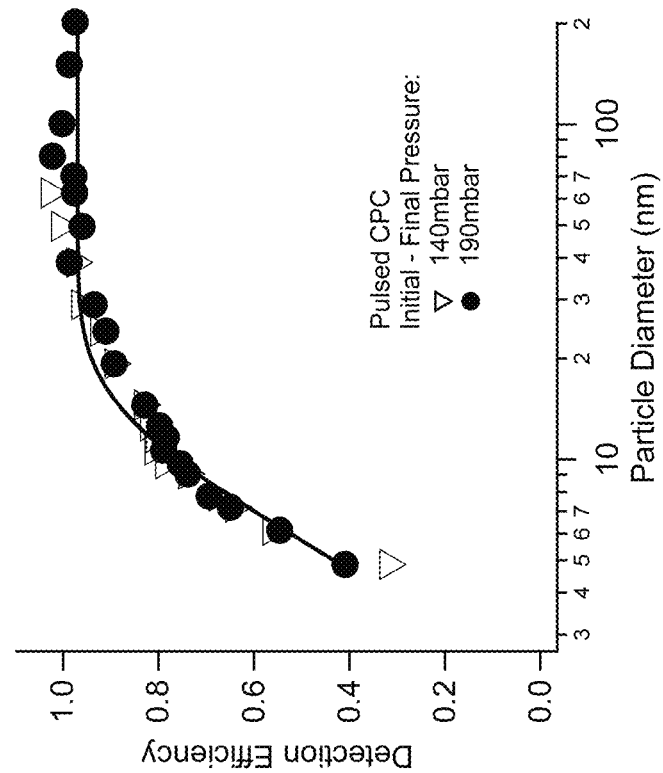
FIG. 19A is the measured detection efficiency of the embodiment of the Pulsed CPC of FIG. 16 vs particle diameter.

Laboratory measurements of the size-dependent detection efficiency of the Nafion-Walled Pulsed CPC 200, are shown in FIG. 19A. The calibration aerosol is monodispersed ammonium sulfate obtained through atomization, charge conditioning and differential mobility selection. Data were obtained at two different operating conditions, the downstream vacuum setting of 800 mbar, and 720 mbar, and generated essentially the same cutoff curve. The dependence of counting efficiency on the concentration of particles is shown in FIG. 19B. For the monodispersed ammonium sulfate calibration aerosols at 30 nm and 50 nm, we varied the concentrations from 10 cm$^{-3}$ to 60×10$^3$ cm$^{-3}$, which is typical of the range of concentrations expected in urban settings, including near-freeway locations.

Figure 20:
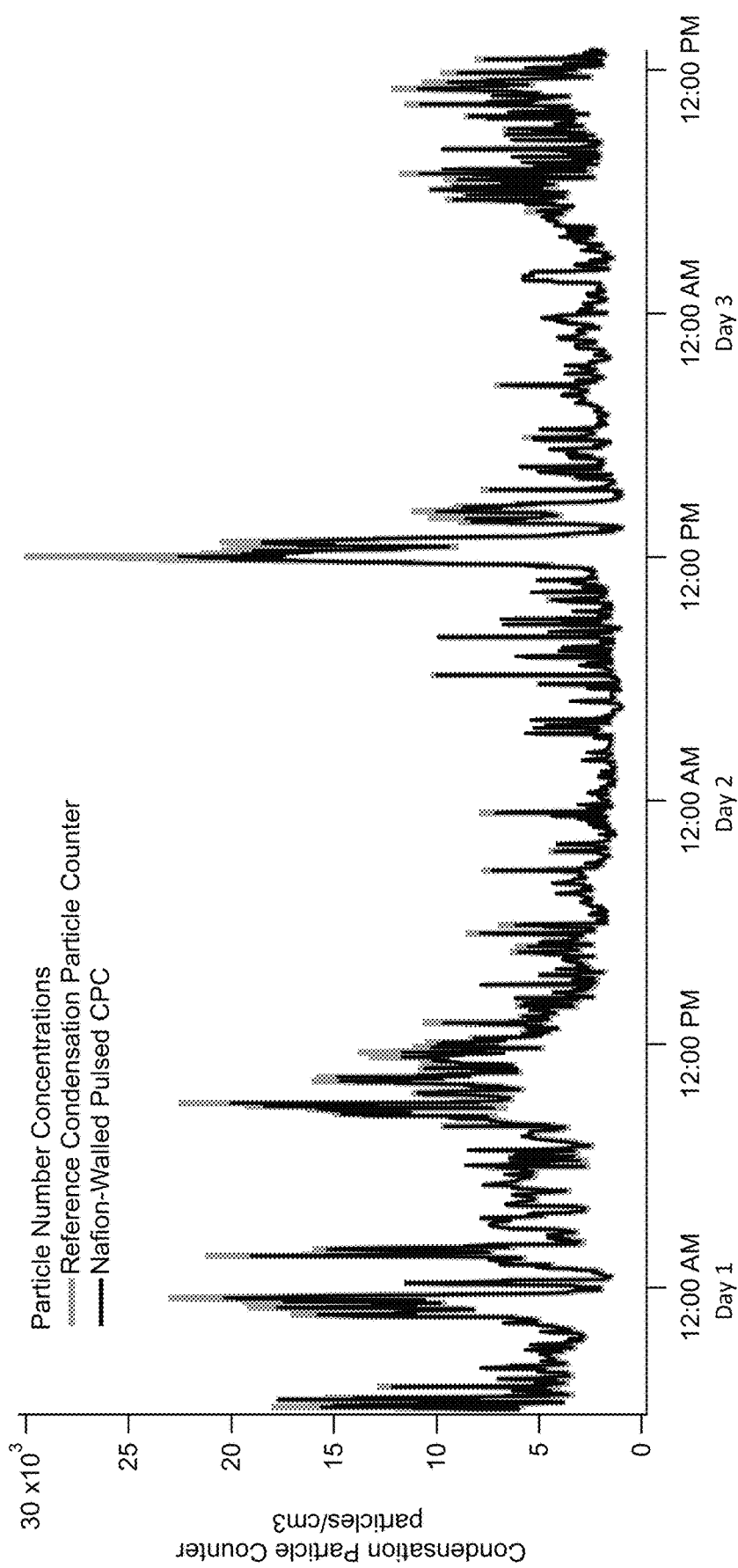
FIG. 20 is a time series comparing ambient particle number concentrations measured with the Pulsed CPC to that measured by a commercial condensation particle counter.
Figure 21:
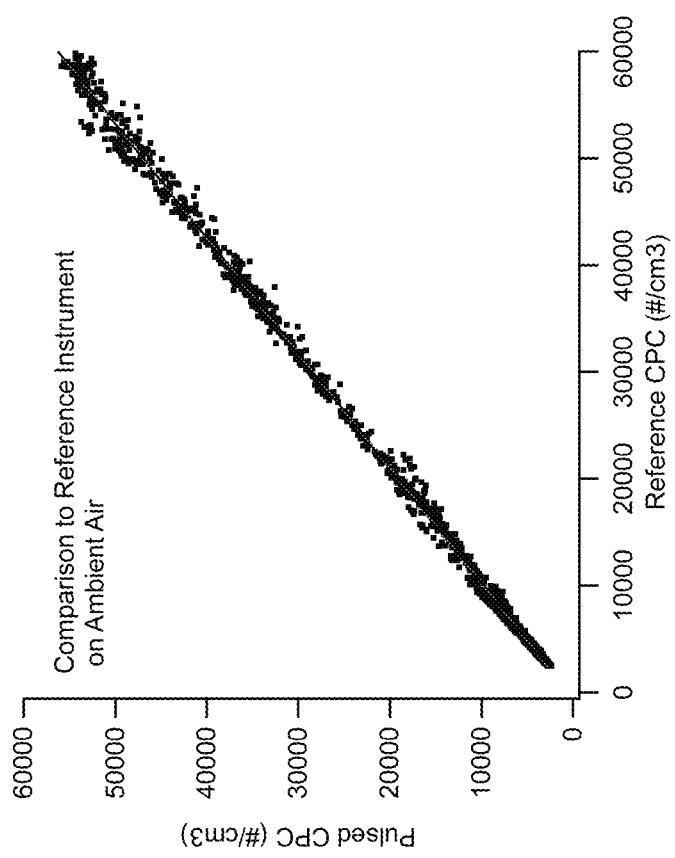
FIG. 21 is a scatterplot of ambient particle number concentrations measured with the Pulsed CPC to that measured by a commercial condensation particle counter.

Ambient data collected using the Pulsed CPC is shown in FIG. 20. Comparison is made to a commercial condensation particle counter. For several sets of multi-day ambient air measurements, scatterplots of the one-minute averaged data yield regression slopes of above 0.9 and correlation coefficients $R^2>0.98$. One such comparison is shown in FIG. 21.

Particle number concentrations are derived from the Pulsed CPC pressure and particle count data during the expansion step. In our experiments, each of these parameters is recorded at a rate of 64 Hz. Referring to $t_o$ as the time at the beginning of the expansion, $t_d$ as the time at which counting begins, and $t_s$ as the time at point s within the expansion that the counting stops, the number of moles $\Delta n_s$ of air that has exited the particle chamber between time $t_o$ to time $t_s$ is given by the ideal gas law $$\Delta n_s = \frac{1}{R}(n_o - n_s) = V_o \left( \frac{P_o}{RT_o} - \frac{P_o}{RT_s} \right)$$

where $n_o$ and $n_s$ are the number of moles of air in the particle chamber at time $t_o$ and $t_s$, respectively, and $V_o$ is the volume of the particle chamber (between the inlet valve and the nozzle exit, and is derived from the mechanical drawings), $P_o$ and $T_o$ are the initial pressure and absolute temperature in the particle chamber at time to, just before the beginning of the expansion, and $P_s$ and $T_s$ are the corresponding values at time $t_s$. To calculate the particle number concentration, the needed parameter is the volume of air $\Delta V_s$ that would be occupied by $\Delta n_s$ moles of air if it were at the initial temperature and pressure in the particle chamber. This corrects the actual volume of air that flows out of the chamber to the volume of equal mass (or moles) at the initial temperature and pressure before expansion. This gives:

$$\Delta V_s = \frac{RT_o}{P_o} \Delta n_s = V_o \left( 1 - \frac{T_o P_s}{T_s P_o} \right)$$

If the expansion is assumed to be approximately isothermal, that is the average temperature in the particle chamber is close to that at which is started (even though the exiting air may be colder) then $(T_o/T_s) \approx 1$. If the expansion were completely adiabatic, that is in the absence of all heat transfer from the walls, then $(T_o/T_s)=(P_o/P_s)^{(\gamma-1)/\gamma}$ where $\gamma$ is the ratio of specific heats for air (=1.4). More generally:

$$\Delta V_s = V_o \left( 1 - \left( \frac{P_s}{P_o} \right)^{\frac{1}{k}} \right)$$

where k=1 for the isothermal assumption, and k=$\gamma$ for purely adiabatic expansion. In practice, we find that k=1 gives a good fit to the data. The exiting amount of air derived from the model calculations shown in FIG. 18A yield a value of k=1.1, which is closer to isothermal than to adiabatic. Referring to $t_d<t_s$ as the time at which counting begins, then the amount (or number of moles) of air exiting the particle chamber between time $t_d$ and $t_s$, expressed as the volume that air would occupy at the temperature and pressure prior to expansion:

$$\Delta V_{d,s} = \Delta V_s - \Delta V_d = V_o \left( \left( \frac{P_d}{P_o} \right)^{\frac{1}{k}} - \left( \frac{P_s}{P_o} \right)^{\frac{1}{k}} \right)$$

The total number of particles C detected as the air expands is simply the sum of the counts $c_i$, with i=0 ... N−1, each counted over the interval t=$t_i$ to t=$t_{i+1}$. The time $t_i=t_d+i\Delta t$. The measurement starts at $t_d=t_0$ and ends at $t_s=t_N$.

$$\Delta C_{d,s} = \sum_{i=0}^{N-1} \frac{c_i}{1 - f_i}$$

where $f_i$ is the effective dead time fraction. Most simply $f_i$ is the fraction of time during the time interval i that the light signal is above the threshold for particle counting. More sophisticated dead time corrections, such as those described in US Patent Publication No. 2020/0408931 may also be used.

The Pulsed CPC particle number concentration is the ratio of particle number to expanded air volume, expressed at the initial temperature and pressure:

$$N_{d,s} = \frac{\Delta C_{d,s}}{\Delta V_{d,s}}.$$

where the subscripts d,s indicate that the counting and measuring was done between time $t_d$ and $t_s$. Typically, these times are: 80 ms<$t_d$<150 ms, and $t_s>t_d+300$ ms. Within this range, the data give approximately the same value for $N_{d,s}$.

Advantages of the Pulsed CPC over existing methods are portability, low power requirement and inherently compact size. The extent of expansion required is low—an adiabatic expansion of 10% of saturated air will activate the condensational growth of particles as small as 6 nm. At an initial humidity of 80%, a range that is easily achievable with Nafion-based humidifiers, a 15% expansion is sufficient for 6-nm particle activation. These values are readily obtained with a small diaphragm pump, such as a Sensidyne model 3A pump. In such pumps, the power requirement is small. For example, the Sensidyne model 3A pump, requires only 240 mW to pull 0.8 atm at a flow of 0.2 L/min. This is an order of magnitude reduction on the 2.2 W power required for an energy-optimized, miniature version of a laminar-flow water-based CPC, where three Peltier heat pumps were used to maintain the required temperature differences along the growth tube. The housing of the Pulsed CPC is isothermal, and all at ambient temperature, eliminating the need for heaters, coolers and fans. The upstream valve 11 need not be air-tight, but must block the flow sufficiently to allow the expansion, in other words the leak rate across the valve must be small compared to the evacuation rate. The Pulsed CPC is also insensitive to flow rate, as the measured air volume is derived from a pressure measurement and the particle chamber geometry.

The Pulsed CPC approach is technically feasible because of the relatively fast rate of droplet growth and as compared to evaporation. Once initiated, particle condensational growth is rapid, but droplet evaporation relatively slow. Activation of condensational growth requires supersaturated conditions, yet once growth is initiated the driving force is large. Growth to a few micrometers occurs within 20-100 ms. Once the droplet reaches micrometer diameters, evaporation is relatively slow even as the saturation ratio drops. At 100% RH the lifetime of a 1 μm droplet is of the order of 1 second. This gives ample time to count the droplets once formed.

All prior adiabatic expansion instruments determine particle number concentrations from the scattering from the ensemble of droplets formed in the particle chamber. Instead, the Pulsed CPC counts individual droplets during the expansion process. As such, it is not subject to the uncertainties of ensemble counting, where the signal depends on the size of the droplets within the chamber as well as on the total number concentration. Another unique aspect is that when operated with wet walls in the particle chamber, the supersaturation obtained during the expansion is enhanced by the transport of water vapor from the walls during the expansion process itself. In this mode of operation, the Pulsed CPC does not rely strictly on adiabatic expansion but is enhanced by diffusion of water vapor from the walls. A third feature is its dual capability to measure larger (>300 nm) airborne particles during the purge state, and then measure all particles, as small as 10 nm in the expansion state. This dual capability provides an optical estimate of the $PM_{2.5}$ parameter of interest due to government regulation, and in the same instrument, measure also the ultrafine particle concentration, of interest to public health.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for measuring a concentration of particles in air, comprising
    introducing an air sample into a particle chamber through an inlet;
    closing the inlet to isolate the particle chamber;
    exhausting the air sample in the isolated particle chamber through a nozzle connected to an optical detector, said exhausting of the flow performed at a flow rate chosen to cause an expansion of any of the air sample inside the particle chamber, reduce a temperature of the any of the air sample inside the particle chamber, increase a relative humidity of any of the air sample inside the particle chamber, and cause vapor to condense on particles suspended in the any of the air sample inside the particle chamber, thereby forming droplets;
    counting the droplets in the air sample as it is exhausted through the optical detector;
    measuring a pressure from which an amount of air exiting the chamber can be assessed; and
    determining a particle concentration as a ratio of a number of droplets detected to the amount of air that has exited the chamber based on the counting and the measuring.

2. The method of claim 1 wherein walls of the particle chamber are wetted with water.

3. The method of claim 1 wherein further comprising configuring the optical detector is to count particles larger than about 200 nm during the introducing of the air sample.

4. The method of claim 1 wherein the counting and measuring steps are performed simultaneously.

5. The method of claim 1 wherein walls of the particle chamber are dry.

6. The method of claim 1 further including humidifying the air sample prior to introducing the air sample into the particle chamber.

7. The method of claim 1 in which walls of the particle chamber are formed from a membrane comprising a membrane that transports vapor but not liquid, on a first side, and having a second side in contact with water or high humidity air, and wherein the method further includes pausing between isolating of the particle chamber and the exhausting of the flow, such that the air within the particle chamber becomes humidified prior to expansion.

8. The method of claim 1 wherein the counting, measuring, and determining are performed during the exhausting.

9. The method of claim 8 comprising continuously repeating the introducing and exhausting.

10. The method of claim 1 wherein the counting measuring and determining includes a delay time between the initiation of the expansion and the initiation of the counting and measuring.

11. A method to create water vapor supersaturation within a wet-walled chamber having an inlet and an outlet; comprising:
    introducing an air sample into the chamber by passing a flow into the wet walled chamber through the inlet by pumping at the outlet;
    closing the inlet while continuing the pumping to exhaust the air sample from the chamber through the outlet, the pumping performed at a rate operable to reduce pressure inside the chamber such that the air sample in a central portion of the chamber cools, and vapor from walls of the chamber has time to diffuse into the air sample in the chamber from the walls; and
    counting droplets in the air sample as it is exhausted through an optical detector.

12. The method of claim 11 comprising continuously repeating the introducing and closing.

13. The method of claim 12 further including pausing between introducing and the closing, such that the air sample within the wet-walled chamber becomes humidified prior to expansion.

14. The method of claim 13 further including:
    measuring a pressure from which an amount of air exiting the chamber can be assessed; and
    determining a particle concentration as a ratio of a number of droplets detected to the amount of air that has exited the chamber based on the counting and the measuring.

15. The method of claim 14 wherein the counting measuring and determining includes a delay time between the initiation of the expansion and the initiation of the counting and measuring.

16. A particle counting apparatus, comprising:
    an inlet;
    a first valve coupled to the inlet;
    a particle chamber coupled to the first valve and having an output;
    an optical detector at the output of the particle chamber and having a detector outlet;
    a pump coupled the detector output and having a pump outlet;
    a second valve coupled between the detector output and the pump; and
    a controller executing code instructing the controller to:
        open the first and second valves, and cause the pump to introduce air into the particle chamber and pump a flow of air through the chamber from the inlet, through to the detector outlet; and
        close the first valve and cause the pump at the outlet to pull air out of the chamber thereby reducing pressure inside the chamber at a flow rate selected to cause the air in a central portion of the chamber to cool and allow water vapor from walls of the chamber to diffuse into the air in the chamber from wet walls, wherein the optical detector is configured to count droplets formed around particles, thereby counting particles.

17. The apparatus of claim 16 wherein the controller executes code instructing the controller to close the second valve while the first valve is closed and prior to causing the pump to reduce pressure inside the chamber.

18. The apparatus of claim 16 wherein the pump is coupled to the detector output by two flow paths between the detector output, one flow path including the second valve and another flow path including a third valve, such that a flow rate at which air is introduced into the particle chamber, and a rate at which air is exhausted from the chamber once the first valve is closed, is independently controlled.

19. The apparatus of claim 16 wherein the optical detector is configured to count particles larger than about 400 nm when the first and second valves are open and the flow is drawn through the particle chamber.

20. The apparatus of claim 16 wherein the controller executes code instructing the controller to:
    measure a pressure from which an amount of air exiting the chamber can be assessed; and
    determine a particle concentration as a ratio of a number of droplets detected to the amount of air that has exited the chamber based on the counting and the measuring.

21. The apparatus of claim 16 wherein the controller executes code instructing the controller to repeatedly: open the first and second valves, and cause the pump to introduce air into the particle chamber; and close the first valve and cause the pump at the outlet to pull air out of the chamber.

* * * * *